(12) United States Patent
Brown et al.

(10) Patent No.: US 11,603,958 B2
(45) Date of Patent: Mar. 14, 2023

(54) SYSTEMS AND METHODS FOR ASSEMBLING STRUCTURAL COMPONENTS

(71) Applicant: House of Design LLC, Nampa, ID (US)

(72) Inventors: Chris Brown, Boise, ID (US); Shane Christopher Dittrich, Nampa, ID (US); Kristopher Ryan Okelberry, Nampa, ID (US); Michael Baker, Meridian, ID (US); Brandon Schmidt, Nampa, ID (US)

(73) Assignee: House of Design LLC, Nampa, ID (US)

( * ) Notice: Subject to any disclaimer, the term of this patent is extended or adjusted under 35 U.S.C. 154(b) by 193 days.

(21) Appl. No.: 16/882,159

(22) Filed: May 22, 2020

(65) Prior Publication Data
US 2020/0378548 A1  Dec. 3, 2020

Related U.S. Application Data

(60) Provisional application No. 62/854,740, filed on May 30, 2019.

(51) Int. Cl.
| | |
|---|---|
| *F16M 11/06* | (2006.01) |
| *F16M 13/02* | (2006.01) |
| *B23Q 3/00* | (2006.01) |
| *B25H 1/08* | (2006.01) |
| *E04C 3/02* | (2006.01) |

(52) U.S. Cl.
CPC .......... *F16M 11/06* (2013.01); *F16M 13/022* (2013.01); *B23Q 3/007* (2013.01); *B25H 1/08* (2013.01); *E04C 3/02* (2013.01); *F16M 2200/044* (2013.01); *F16M 2200/063* (2013.01); *F16M 2200/065* (2013.01)

(58) Field of Classification Search
USPC .......................................................... 29/432
See application file for complete search history.

(56) References Cited

U.S. PATENT DOCUMENTS

| | | | | |
|---|---|---|---|---|
| 4,084,498 A * | 4/1978 | Weaver | ................... | B27F 7/155 269/910 |
| 4,415,149 A * | 11/1983 | Rees | ........................ | B25H 1/10 269/297 |
| 7,445,346 B2 * | 11/2008 | Rizzo | ..................... | G03B 21/22 211/171 |
| 8,870,280 B2 * | 10/2014 | Dehli | ..................... | A47C 7/622 108/50.11 |
| 9,320,352 B2 * | 4/2016 | Blackburn | ......... | A47B 21/0314 |

(Continued)

*Primary Examiner* — Monica E Millner
(74) *Attorney, Agent, or Firm* — Foley & Lardner LLP

(57) ABSTRACT

Systems and methods for assembling structural components are disclosed wherein a selectively configurable fixture is placed on an assembly surface of an assembly table. An assembly table interface couples about a pin of a pin slot of the assembly table and, by means of linkage assembly, translates movement of the pin to a positioning member. The positioning member, by the translated movement of the pin, abuts an element of structural component and supports the element while a fastener is applied to join multiple elements of the structural component. A selectively configurable fixture may be used in isolation, or in combination with other fixtures.

22 Claims, 14 Drawing Sheets

(56) References Cited

U.S. PATENT DOCUMENTS

| | | | |
|---|---|---|---|
| 2004/0069109 A1* | 4/2004 | Sprague | B27B 5/208 83/581 |
| 2005/0055955 A1* | 3/2005 | McAdoo | E04C 3/16 52/633 |
| 2005/0071977 A1* | 4/2005 | Kanjee | E04C 3/16 29/772 |
| 2005/0071994 A1* | 4/2005 | Kanjee | B27F 7/155 29/772 |
| 2008/0232945 A1* | 9/2008 | Holodryga | B23Q 3/062 414/783 |
| 2008/0236945 A1* | 10/2008 | Larouche | B25H 1/16 182/153 |
| 2011/0315843 A1* | 12/2011 | Hung | F16M 13/022 248/278.1 |
| 2017/0173779 A1* | 6/2017 | Luis y Prado | B25H 1/10 |

\* cited by examiner

SYSTEMS AND METHODS FOR ASSEMBLING STRUCTURAL COMPONENTS

RELATED APPLICATIONS

This application claims the benefit under 35 U.S.C. § 119(e) of U.S. Provisional Application No. 62/854,740, entitled SYSTEMS AND METHODS FOR ASSEMBLING STRUCTURAL COMPONENTS, filed May 30, 2019, which is hereby incorporated by reference herein in its entirety.

TECHNICAL FIELD

The present disclosure relates generally to the field of assembling structural components, and more particularly to systems and methods for pre-fabricating structural components, such as a truss, a frame member, etc., for building construction.

BACKGROUND

Pre-fabrication of structural components, such as trusses, can save significant time at a construction site and improve efficiency and expedite completion of a construction project. Automated pre-fabrication of structural components is presently limited because of challenges in manipulating and joining structural members (e.g., boards) to an appropriate position for joining together.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1:
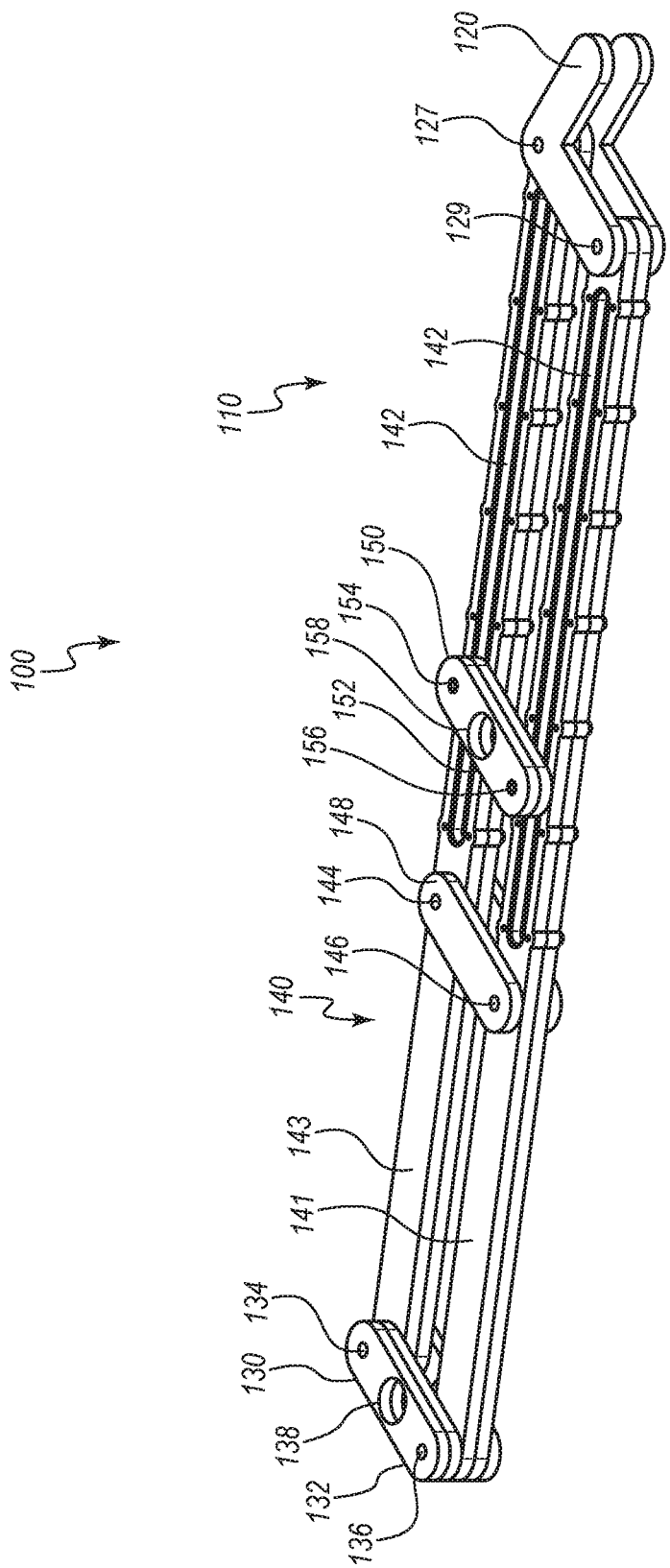
FIG. 1 is a perspective view of a structural component assembly system, comprising a fixture.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Structural components, such as wall frames, partition frames, trusses, etc., are often assembled at a factory. Factory assembly provides a number of advantages, including consistency of product and speed and/or efficiency of production. Conversely, factory assembly is sometimes less than ideal for custom products, which may require additional time and manpower to manually configure an assembly table, manually place some or all of the structural component members, and manually apply some or all of the fasteners. Also, custom, or one-off structural components may lack a consistency of quality relative to non-custom products. An industry practice to reduce quality variations may include limiting non-mass production to a particular set of semi-custom structural components so that individual variations are eliminated and opportunities for human error are reduced. Fixtures which can be selectively configured, such as those disclosed herein, may also reduce quality variations while enabling a greater degree of customization.

Moreover, the phrases "connected to" and "coupled to" are used herein in their ordinary sense, and are broad enough to refer to any suitable coupling or other form of interaction between two or more entities, including mechanical, fluid, and thermal interaction. Two components may be coupled to each other even though they are not in direct contact with each other. The phrase "attached to" refers to interaction between two or more entities which are in direct contact with each other and/or are separated from each other only by a fastener of any suitable variety (e.g., an adhesive, stitching, etc.).

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand.

The terms "a" and "an" can be described as one, but not limited to one. For example, although the disclosure may recite an element having, e.g., "a line of stitches," the disclosure also contemplates that the element can have two or more lines of stitches.

Unless otherwise stated, all ranges include both endpoints and all numbers between the endpoints.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment. Not every embodiment is shown in the accompanying illustrations, however, at least a preferred embodiment is shown. At least some of the features described for a shown preferred embodiment are present in other embodiments.

FIG. 1 is a perspective bottom view of a structural component assembly system 100, comprising a fixture 110. The fixture 110 comprises a first assembly table interface 130, a positioning member 120, and a linkage assembly 140 extending between and coupling the first assembly table interface 130 and the positioning member 120. The first assembly table interface 130 comprises a first pivot 134 and a first pin aperture 138. In one embodiment, the first assembly table interface 130 further comprises a first guide rail 132. The first pivot 134 has a pivot axis that is configured to be oriented perpendicular to a plane that is parallel to an assembly surface of an assembly table (see assembly surface 198, assembly table 190 in FIG. 2A). The first pin aperture 138 passes through the first assembly table interface 130 and is configured to receive, or to be received by, a first pin (see, e.g., pin 192 in FIG. 2A) of an assembly table (see, e.g., assembly table 190 of FIG. 2A). More particularly, the first pin aperture 138 has a form and a dimension conforming to a pin of an assembly table. The first assembly interface 130 may couple to the assembly table by placing the first pin aperture 138 about the first pin of the assembly table and positioning the first guide rail 132 in a pin slot at an orientation relative to the first pin of the assembly table. In other embodiments, a first assembly interface may couple to the assembly table by a coupling other than a first pin aperture to a first pin. For example, a first assembly interface may couple by a bolt through an aperture of the first assembly interface to a component of the table (e.g., a driven nut of the table), a pin on the first assembly interface configured to mate into an aperture of a component of the table, or any other suitable coupling mechanism, device or method to allow pivotable coupling of the first assembly interface to a component of the table.

The positioning member 120 has a pivot 127 corresponding to the first pivot 134 of the first assembly table interface 130 and has a pivot axis parallel to the pivot axis of the first pivot 134 of the first assembly table interface 130. In other words, the first pivot 127 of the positioning member 120 has a pivot axis perpendicular to the plane of an assembly surface of the assembly table. The linkage assembly 140 comprises a first bar 143 pivotably coupling between the first pivot 134 of the assembly table interface 130 and the first pivot 127 of the positioning member 120. The first bar 143 of the linkage assembly 140 may have a fixed length and a fixed width. A first end of the first bar 143 of the linkage assembly 140 pivotably couples to the first pivot 127 of the positioning member 120, and a second end of the first bar 143 pivotably couples to the first pivot 134 of the first assembly table interface 130. A longitudinal axis of the first bar 143 of the linkage assembly 140 pivots about the first pivot 134 of the first assembly table interface 130 within the plane parallel to the assembly surface of the assembly table.

In the embodiment of FIG. 1, the assembly table interface 130 has a second pivot 136 having a pivot axis parallel to the pivot axis of the first pivot 134 of the first assembly table interface 130. The positioning member 120 has a second pivot 129 having a pivot axis parallel to the pivot axis of the first pivot 127 of the positioning member 120. The linkage assembly 140 comprises an additional, or second bar 141 which is substantially the same length as the first bar 143, and which pivotably couples between the second pivot 136 of the first assembly table interface 130 and the second pivot 129 of the positioning member 120. The fixture 110 thus comprises a 4-bar linkage assembly 140 defining a parallelogram lying within a plane parallel to the assembly surface of the assembly table. The first assembly table interface 130 and the positioning member 120 define a first pair of equal and opposite sides of the parallelogram; and the first and second bars 143, 141 of the linkage assembly 140 define a second pair of equal and opposite sides of the parallelogram. In other words, the parallelogram comprises four sides or bars defined by the first and second bars 143, 141, the first assembly table interface 130, and the positioning member 120. Each of the four bars or sides pivotably couples to an adjacent bar or side of the parallelogram. Pivoting of the linkage assembly 140 may cause the positioning member 120 to be selectively repositionable on the assembly surface of the assembly table while retaining an orientation of the positioning member 120 relative to the assembly surface. The positioning member 120 is configured to abut against a face or surface of an element of a structural component during assembly of the structural component, as further described below with reference to FIG. 3. With the first pin aperture 138 engaged about first pin of the assembly table, movement of the first pin along a pin slot is translated to identical movement of the first assembly table interface 130, and may be translated through the first assembly table interface 130 to the linkage assembly 140 and to the positioning member 120, such that the positioning member 120 may be moved relative to the assembly table while maintaining a fixed orientation relative to the assembly table and the first pin. In other words, movement of the first pin may cause movement of the first assembly table interface 130, and movement of the first assembly table interface 130 may be translated through the linkage assembly 140 to move the positioning member 120.

In one embodiment, the fixture 110 further comprises a medial stability member 150 that can provide a second assembly table interface, hereafter, a second assembly table interface 150. The second assembly table interface 150 comprises a first pivot 154 having a pivot axis parallel to the pivot axis of the first pivot 134 of the first assembly table interface 130. The first bar 143 of the linkage assembly 140 pivotably couples between the first pivots 134, 154, 127 of the first assembly table interface 130, the second assembly table interface 150, and the positioning member 120, respectively, whereby the pivot axis of each of the first pivots 134, 154, 127 are parallel to each either and aligned in a line. The second assembly table interface 150 further comprises a second pin aperture 158 configured to receive or be received by a second pin of the assembly table. In one embodiment, the second assembly table interface 150 further comprises a second pivot 156 having a pivot axis parallel to the pivot axis of the first pivot 154 of the second assembly table interface 150. The second bar 141 of the linkage assembly 140 pivotably couples between the second pivots 136, 156, 129 of the first assembly table interface 130, the second assembly table interface 150, and the positioning member 120, respectively, whereby the pivot axis of each of the second pivots 136, 156, 129 are parallel to each other and aligned in a single line parallel to the single line of the first pivots 134, 153, 127. The second assembly table interface 150 may be slidably (and simultaneously pivotably) coupled to the first and second bars 143, 141 of the linkage assembly 140 whereby the second assembly interface 150 slides along the linkage assembly 140 to accommodate the varying geometry of the parallelogram defined by the linkage assembly 140 as either, or both of, the first pin and second pin move. The first and second bars 143, 141 each include a slot 142 or track along a distal portion. Each slot 142 allows one of the first and second pivots 154, 156 of the second assembly table interface 150 to slide toward and away from the positioning member 120.

The fixture may further comprise a medial stability member 148. The medial stability member 148 may couple a pivot 144 to the first bar 143, and at another pivot 146 to the second bar 141. The pivot 144 has a pivot axis which is perpendicular to the plane parallel to the assembly surface of the assembly table. The pivot 146 has a pivot axis parallel to the pivot axis of the pivot 144. A distance between the pivots 144 and 146 may equal a distance between the first and second pivots 134, 136 of the first assembly table interface 130. A distance between the first pivot 134 of the first assembly table interface 130 and the pivot 144 may equal a distance between the second pivot 136 of the first assembly table interface 130 and the pivot 146.

Figure 2B:
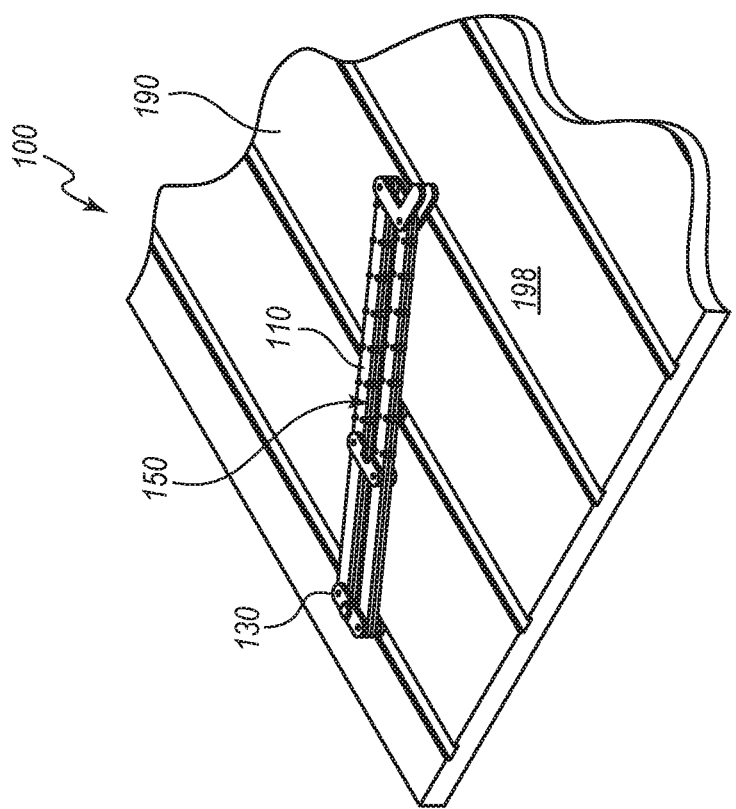
FIG. 2B is a perspective view of the structural component assembly system, with the fixture on the assembly surface of the assembly table.
Figure 2A:
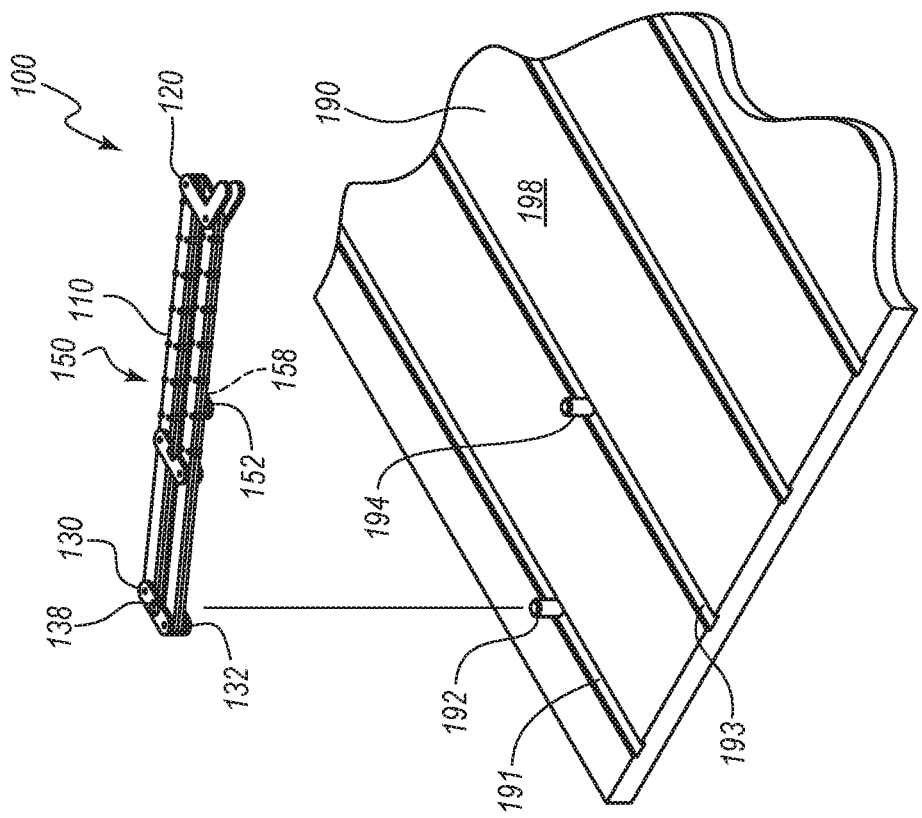
FIG. 2A is a perspective view of the structural component assembly system, depicting the fixture of FIG. 1 above a portion of an assembly table.

FIG. 2A is a perspective view of the structural component assembly system 100, depicting the fixture 110 of FIG. 1 above a portion of an assembly table 190. FIG. 2B is a perspective view of the structural component assembly system 100, with the fixture 110 on an assembly surface 198 of the assembly table 190. With reference to FIGS. 2A and 2B, the assembly table 190 comprises a plurality of pins, e.g., pins 192, 194, disposed in a plurality of pin slots, e.g., 191, 193. The depiction of the first pin slot 191 and the second pin slot 193 as adjacent one another, and the first pin 192 and second pin 194 in adjacent pin slots 191, 193 is for convenience of the disclosure and not a limitation. The first pin aperture 138 can be aligned to a first pin 192 and the second pin aperture 158 can be aligned to a second pin 194, whereby the fixture 110 may be placed against the assembly surface 198 with the first pin aperture 138 on and about the first pin 192 and the second pin aperture 158 on and about the second pin 194. The first guide rail 132 may be configured to interface with a pin slot 191 of the assembly table 190. The first guide rail 132 may be at least partially inserted into a first pin slot 191, and the second guide rail 152 may be at least partially inserted into a second pin slot 193. With the first pin aperture 138 mated to or otherwise engaged with the first pin 192, the second pin aperture 158 mated to or otherwise engaged with the second pin 194, the first guide rail 132 mated to or otherwise engaged with the first pin slot 191, and the second guide rail 152 mated to or otherwise engaged with the second pin slot 193, the fixture 110 is movable and configurable by means of the first and second pins 192, 194. For example, both pins 192, 194 may be moved simultaneously in a same direction whereby the fixture 110 is moved in that direction without alteration of configuration. In like fashion, movement of only one of the first pin 192 or the second pin 194 will cause movement of the respective mated first or second assembly table interface 130 or 150, which, in addition to movement of the first or second assembly table interface 130 or 150, causes the fixture 110 to selectively reconfigure. The first assembly table interface, 130, the second assembly table interface 150, and the positioning member 120 can remain parallel to each other during the reconfiguration of the fixture. More particularly, the positioning member 120 may be selectively repositionable while retaining a fixed orientation.

Figure 3:
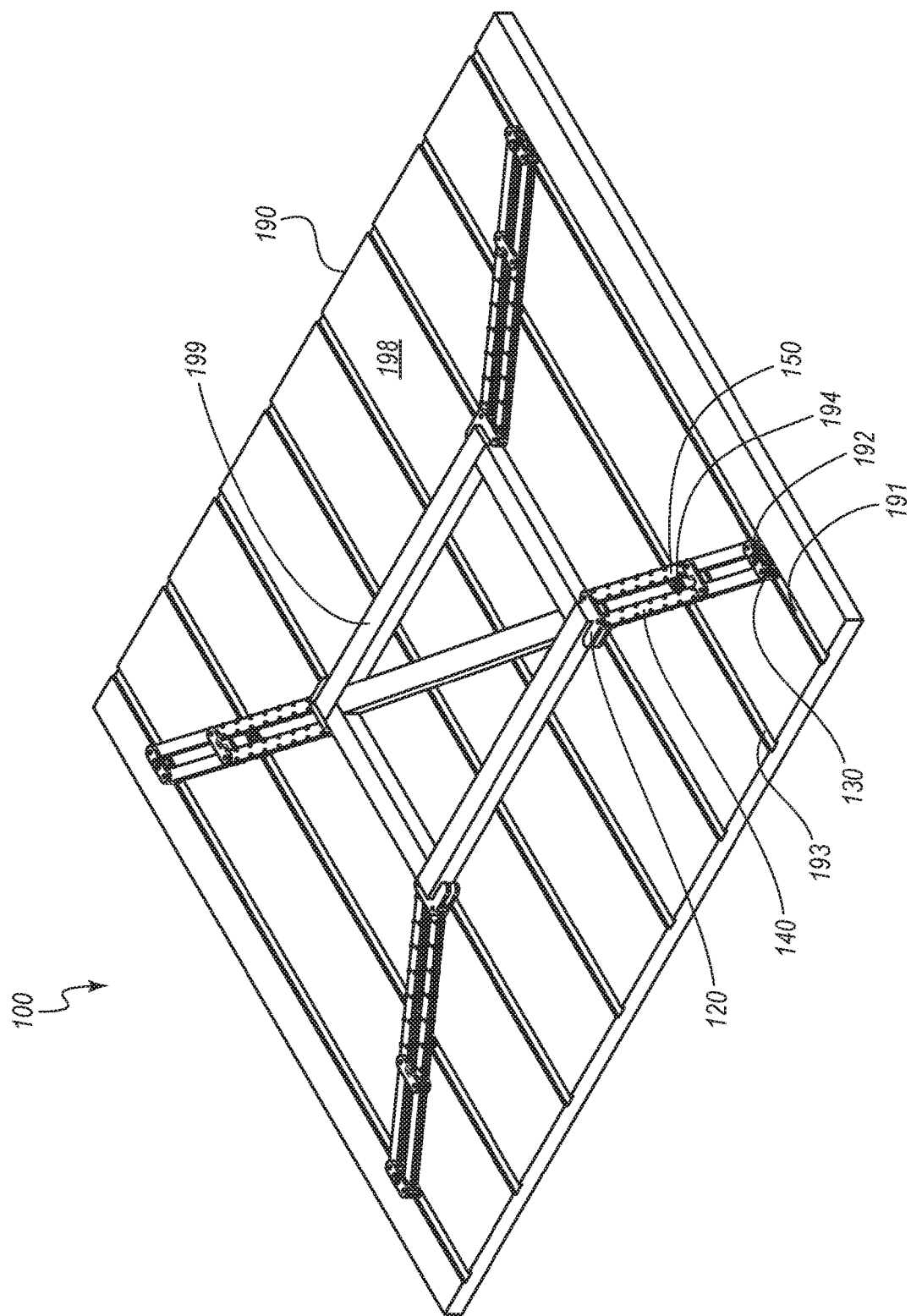
FIG. 3 is a perspective view of the structural component assembly system, depicting the fixture of FIGS. 1-2B employed during assembly of a structural component.

FIG. 3 is a perspective view of the structural component assembly system 100, depicting the fixture 110 of FIGS. 1-2B being utilized during assembly of a structural component 199. The fixture 100 is shown mated to or otherwise engage with the first pin 192, the second pin 194, the first pin slot 191, and the second pin slot 193. The pins 192, 194 have been moved or positioned to articulate the fixture 110 through the first assembly table interface 130, the second assembly table interface 150, and the linkage assembly 140 to position the positioning member 120 to abut an element of the structural component 199. In FIG. 3, three additional iterations of the fixture 110 are shown similarly abutting different portions of the structural component 199. In particular, each of the additional fixtures is in many respects similar to the fixture 110, however, fixtures of differing configuration are also anticipated by the disclosure. Some examples of differing configurations of fixtures are described herein.

The fixture 110, through movement of the pins 192, 194 may be configured so the position member 120 abuts the portion of the structural component 199. Furthermore, the fixture 110 may be configured by the pins 192, 194 whereby the positioning member 120 may exert a directional force upon the element of the structural component 199. The positioning member 120 may retain the element of the structural component 199 in a selectable position on the assembly table 190 to receive a fastener whereby multiple elements of the structural component may be coupled or joined together.

The form of the structural component 199 in FIG. 3 is for ease of illustration and not a limitation of the disclosure. The structural component 199 may comprise any of a variety of structural components for construction of a building. By way of example, such structural components include wall frame units, doorways, window framing units, ceiling support members, trusses, and more. While FIG. 3 depicts four fixtures according to an embodiment of the fixture 110 of FIGS. 1-2B, fewer or more fixtures may be employed, or fixtures of another embodiment, or fixtures of multiple embodiments may be employed by the structural component assembly system 100.

Figure 4:
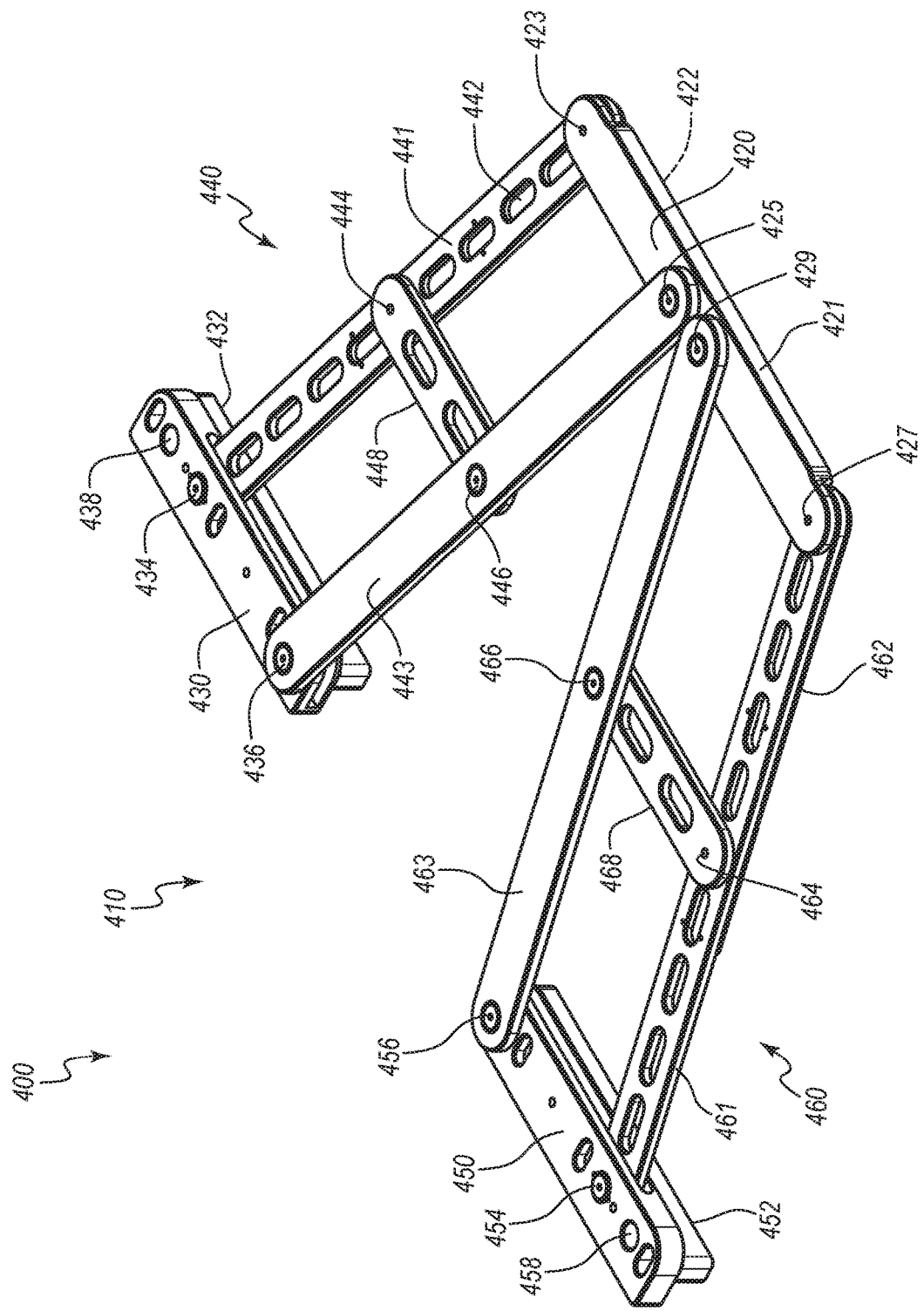
FIG. 4 depicts an embodiment of a structural component assembly system, according to another embodiment.

FIG. 4 depicts an embodiment of a structural component assembly system 400 that resembles the structural component assembly system 100 described above in certain respects. Accordingly, like features are designated with like reference numerals, with the leading digits incremented to "4." For example, the embodiment depicted in FIG. 4 includes a fixture 410 that may, in some respects, resemble the fixture 110 of FIGS. 1-3. Relevant disclosure set forth above regarding similarly identified features thus may not be repeated hereafter. Moreover, specific features of the structural component assembly system 100 and related components shown in FIGS. 1-3 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the structural component assembly system 400 and related components depicted in FIG. 4. Any suitable combination of the features, and variations of the same, described with respect to the structural component assembly system 100 and related components illustrated in FIGS. 1-3 can be employed with the structural component assembly system 400 and related components of FIG. 4, and vice versa. This pattern of disclosure applies equally to further embodiments depicted in subsequent figures and described hereafter, wherein the leading digits may be further incremented.

FIG. 4 is a perspective view of a structural component assembly system 400 comprising a fixture 410. The fixture 410 comprises a first assembly table interface 430, a second assembly table interface 450, a positioning member 420, a first linkage assembly 430, and a second linkage assembly 460. The first and second assembly table interfaces 430, 450 substantially mirror each other.

Figure 5A:
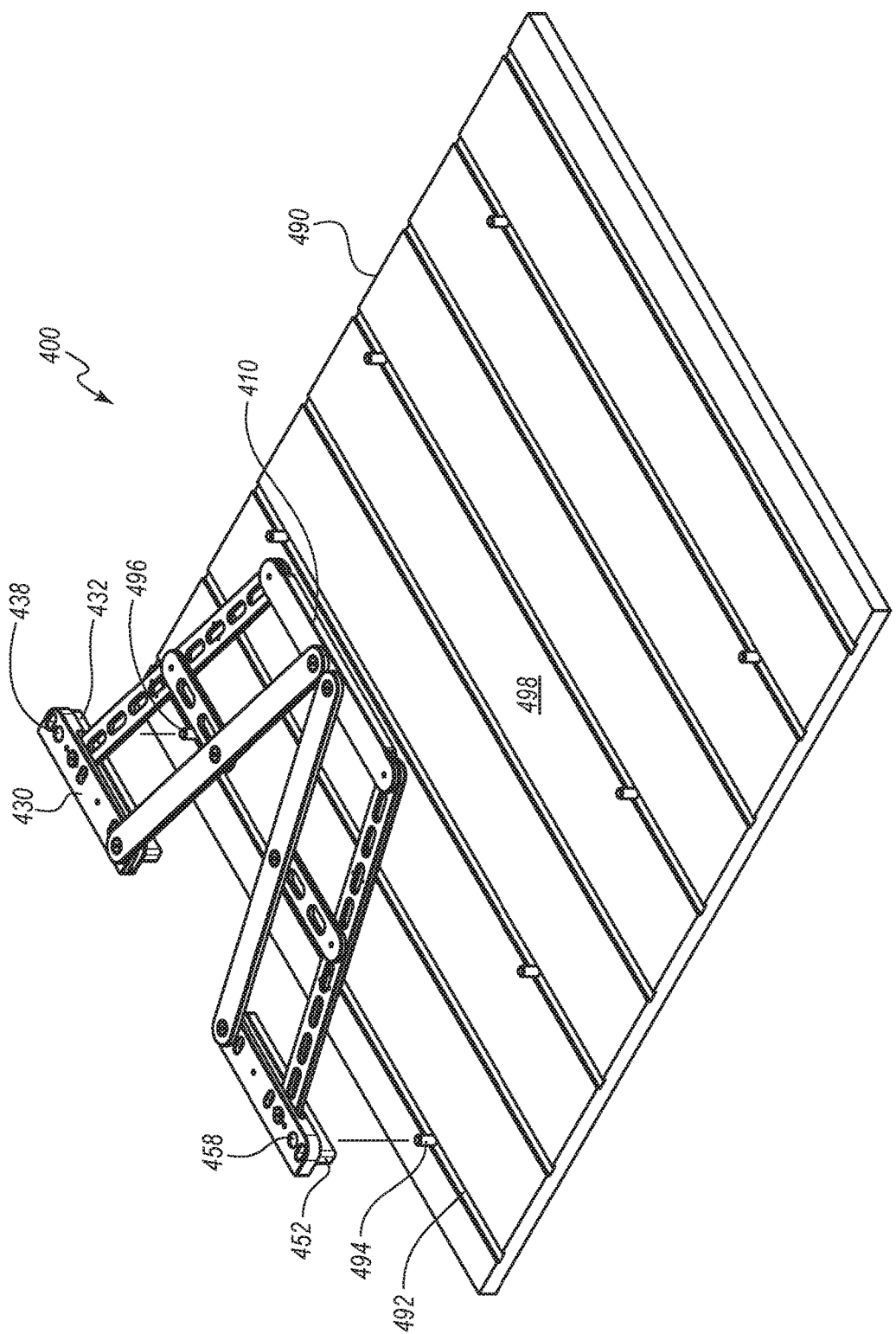
FIG. 5A is a perspective view of the structural component assembly system of FIG. 4, with the fixture depicted above the assembly surface of the assembly table.

The first assembly table interface 430 comprises a first pivot 434 having a pivot axis substantially perpendicular to a plane parallel to an assembly surface of an assembly table (see assembly surface 498, assembly table 490 of FIG. 5A). The first assembly table interface 430 further comprises a second pivot 436 having a pivot axis parallel to the pivot axis of the first pivot 434. The first assembly table interface further comprises a first pin aperture 438 and a first guide rail 432. The first pin aperture 438 passes through the first assembly table interface 430 and is configured to receive, or be received by, a first pin (see 496 in FIG. 5A) of the assembly table 490.

The positioning member 420 comprises a first pivot 423 having a pivot axis parallel to the pivot axis of the first pivot 434 of the first assembly table interface 430. The positioning member 420 further comprises a second pivot 425, a third pivot 427, and a fourth pivot 429, each having a pivot axis parallel to the pivot axis of the first pivot 423 of the positioning member, and each disposed on a line passing through the center of each of the pivots 423, 425, 427, 429. In one embodiment, the positioning member 420 further comprises a glide 422 to facilitate movement and articulation of the fixture 410.

The first linkage assembly 440 comprises a first bar 441 and a second bar 443. The first bar 441 pivotably couples between the first pivot 434 of the first assembly table interface 430 and the first pivot 423 of the positioning member 420. The first bar 441 further comprises a glide 442 to facilitate movement and articulation of the fixture 410 on the assembly surface 498 of the assembly table 490. The first linkage assembly 430 further comprises a second bar 443 coupling between the second pivot 436 of the first assembly table interface 430 and the second pivot 425 of the positioning member 420. The first assembly table interface 430 and the positioning bar 420 define a first pair of equal and opposite sides of a first parallelogram lying within a plane parallel to the assembly surface 498 of the assembly table 490. The first and second bars 441, 443 of the first linkage assembly 440 define a second pair of equal and opposite sides of the first parallelogram. In one embodiment, the first linkage assembly 440 further comprises a medial stability member or stabilizing bar 448. The stabilizing bar 448 pivotably couples between the first bar 441 and the second bar 443 at a pivot situated at or near a midpoint of each of the first and second bars 441, 443 whereby the stabilizing bar 448 is disposed parallel to both the first assembly table interface 430 and the positioning member 420.

The second assembly table interface 450, which substantially mirrors the first assembly table interface 430, comprises a first pivot 454 having a pivot axis substantially perpendicular to a plane parallel to the assembly surface 498 of the assembly table 490. The second assembly table interface 450 further comprises a second pivot 456 having a pivot axis parallel to the pivot axis of the first pivot 454. The second assembly table interface further comprises a second pin aperture 458 and a second guide rail 452. The second pin aperture 458 passes through the second assembly table interface 450 and is configured to receive, or be received by, a second pin (see 494 in FIG. 5A) of the assembly table 490.

The second linkage assembly 460 comprises a first bar 461 and a second bar 463. The first bar 461 pivotably couples between the first pivot 454 of the second assembly table interface 450 and the third pivot 427 of the positioning member 420. The first bar 461 further comprises a glide 462 to facilitate movement and articulation of the fixture 410 on the assembly surface 498 of the assembly table 490. The second linkage assembly 460 further comprises a second bar 463 coupling between the second pivot 456 of the second assembly table interface 460 and the fourth pivot 429 of the positioning member 420. The second assembly table interface 460 and the positioning bar 420 define a first pair of equal and opposite sides of a second parallelogram lying within the plane parallel to the assembly surface 498 of the assembly table 490. The first and second bars 461, 463 of the second linkage assembly 460 define a second pair of equal and opposite sides of the second parallelogram. Stated otherwise, the sides of each of the parallelogram are defined by first bar 441, 461, a second bar 443, 463, a, respectively, first or second assembly table interface 430, 450, and the positioning member 420, with the positioning member 420 common to both parallelograms Each bar or side of each parallelogram pivotably couples to an adjacent bar or side of the respective parallelogram. In one embodiment, the second linkage assembly 460 further comprises a stabilizing bar 468. The stabilizing bar 468 pivotably couples between the first bar 461 and the second bar 463 at a pivot situated at or near a midpoint of each of the first and second bars 461, 463 whereby the stabilizing bar 468 is disposed parallel to both the second assembly table interface 450 and the positioning member 420. Pivoting of the first or second linkage assembly 440, 460 inherently causes pivoting of the opposite linkage assembly and translates to movement of the positioning member 420.

Figure 5B:
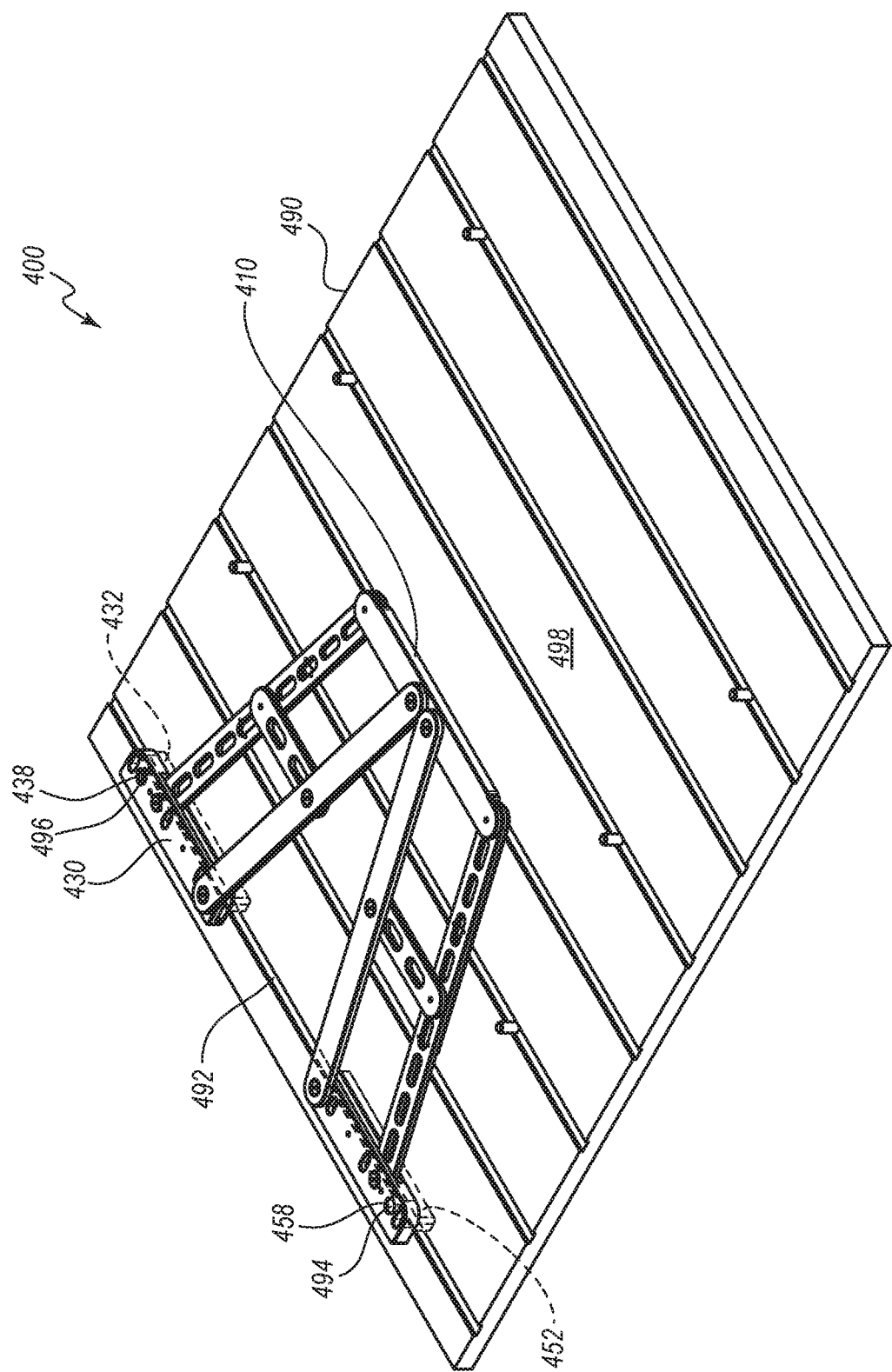
FIG. 5B is a perspective view of the structural component assembly system of FIG. 5A, with the fixture depicted on the assembly surface of the assembly table.

FIG. 5A is a perspective view of the structural component assembly system 400 of FIG. 4, with the fixture 410 depicted above the assembly surface 498 of the assembly table 490. FIG. 5B is a perspective view of the structural component assembly system 400 of FIG. 5A, with the fixture 410 depicted on the assembly surface 498 of the assembly table 490. With respect to FIGS. 5A and 5B, the assembly table 490 is shown having a plurality of pin slots, of which the pin slot 492 is a member. The pin slot 492 has at least two pins 494, 496 which are disposed away from each other. The fixture 410 may be disposed above the assembly surface 498 of the assembly table 490 whereby the first pin aperture 438 of the first assembly table interface 430 is aligned with a first pin 496, and the second pin aperture 458 of the second assembly table interface 450 is aligned with a second pin 494. With the fixture 410 thus aligned, the fixture 410 may be lowered to the assembly surface 498 whereby the first and second pin apertures 438, 458 receive or are received by, respectively, the first pin 496 and the second pin 494. The first and second pin apertures 438, 458 each has a form and dimension conforming to the first and second pins 496, 494.

With the fixture 410 disposed with the first and second pin apertures 438, 458 mated to, respectively, the first and second pins 496, 494, the first and second guide rails 432, 452 may be disposed at least partially within the pin slot 492.

Figure 6A:
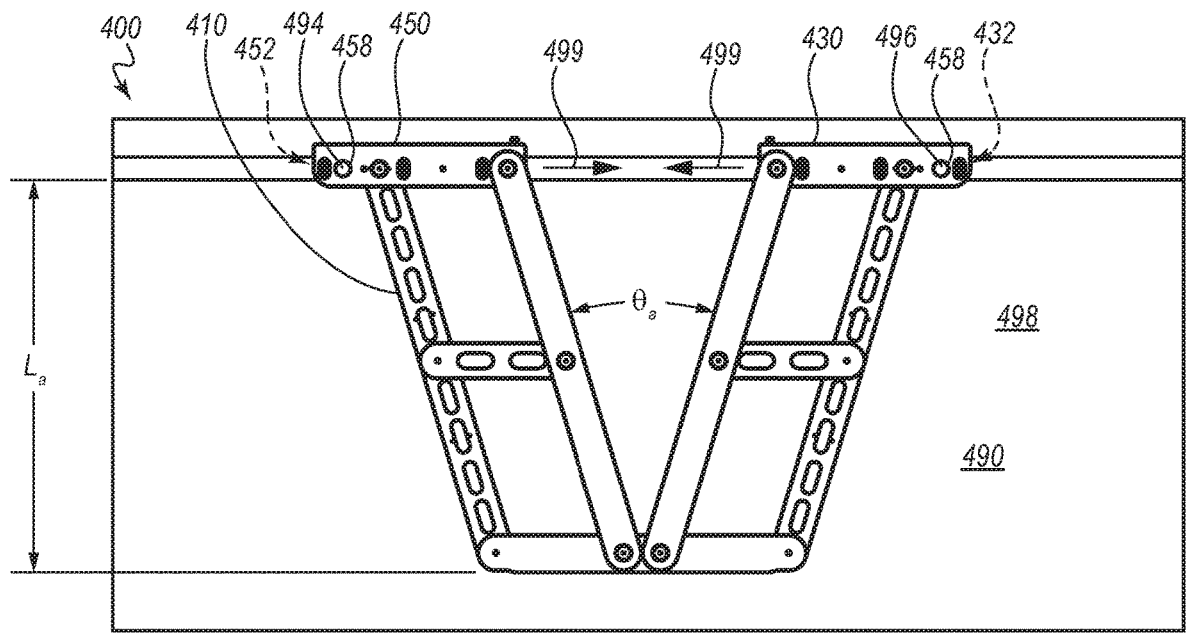
FIG. 6A is a plan view of a structural component assembly system with the fixture in a first configuration.
Figure 6B:
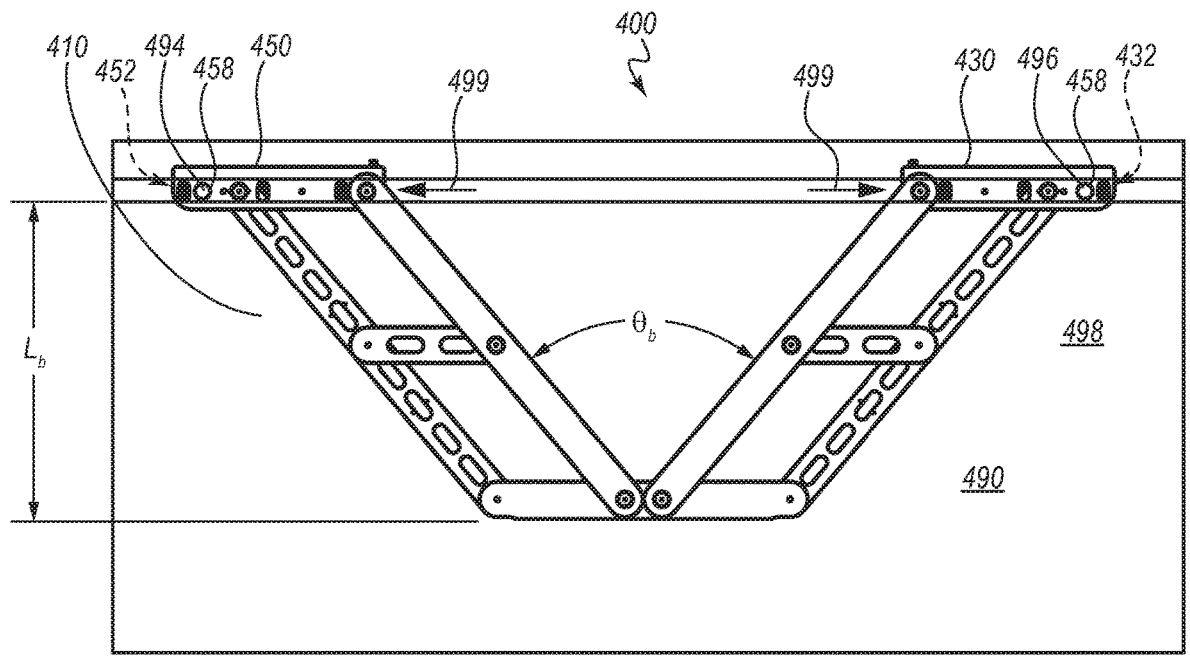
FIG. 6B is a plan view of the structural component assembly system of FIG. 6A with the fixture in a second configuration.

FIG. 6A is a plan view of the structural component assembly system 400 of FIGS. 4-5B with the fixture 410 disposed in a first configuration. FIG. 6B is a plan view of the structural component assembly system 400 of FIG. 6A with the fixture 410 disposed in a second configuration. With respect to FIGS. 6A and 6B, once the fixture 410 is coupled to the assembly table 490 by mating the first and second pin apertures 438, 458 to the, respectively, first and second pins 496, 494, and mating the first and second guide rails 432, 452 to the pin slot 492, the fixture 410 may be moved and articulated by movement of the pins 496, 494. The pins 496, 494 may be synchronously moved in one direction, whereby the fixture 410 retains a present configuration and moves along the assembly surface 498 of the assembly table 490 in the direction of the pin movement in the pin slot 492. The pins 496, 494 may also be moved individually or in opposite directions 499, whereby the fixture 410 may be selectively articulated to a different configuration (e.g. from the first configuration of FIG. 6A to the second configuration of FIG. 6B). For example, if the pins 496, 494 move toward each other 499, as in FIG. 6A, an angle $\theta_a$ (an angle between the first and second linkage assemblies 440, 460) is reduced and, simultaneously, a length $L_a$ (a distance between the first and second assembly table interfaces 430, 450 and the positioning member 430) is increased. Conversely, if the pins 496, 494 move away from each other 499, as in FIG. 6B, the angle $\theta_b$ is increased and, simultaneously, the length $L_b$ is decreased. Moving the pins 496, 494 may permit selectively placing the positioning member at a desirable location on the assembly surface 498 of the assembly table 490.

Figure 7:
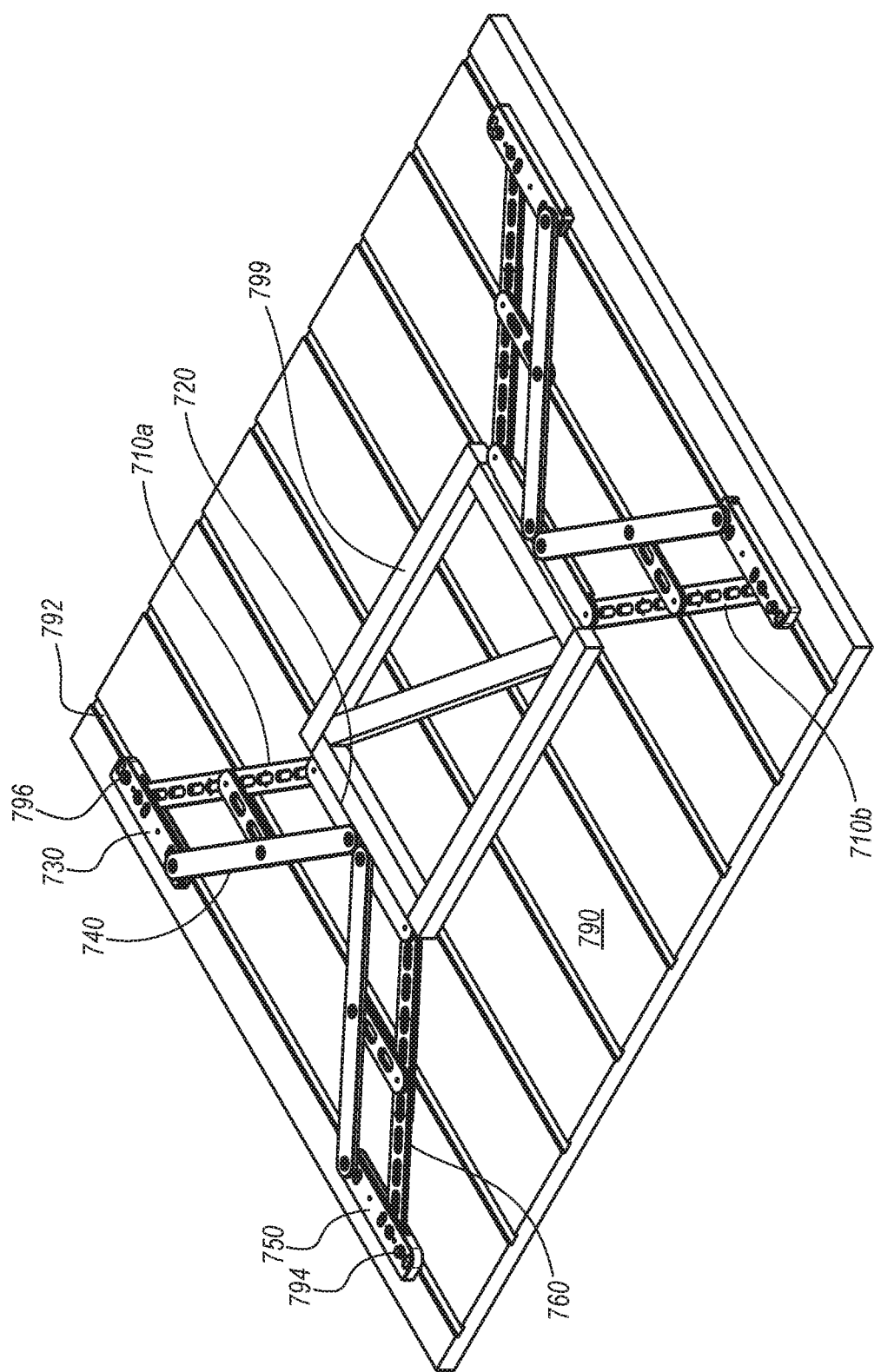
FIG. 7 is a perspective view of a structural component assembly system having two fixtures on an assembly table.

FIG. 7 is a perspective view of a structural component assembly system 700 having two fixtures 710a, 710b on an assembly table 790. The fixture 710a, in many respects, is similar to the fixture 410 of FIGS. 4-6B. The fixture 710b is depicted as similar to the fixture 710a, however, the disclosure anticipates a fixture after another embodiment may be used in place of 710b or in addition.

The fixture 710a is coupled, at the first and second assembly table interfaces 730, 750, to the first and second pins 796, 794. Movement of the pins 796, 794 translates to movement of the fixture 710a, and articulation of the fixture 710a, whereby the positioning member 720 may abut an element of a structural component 799 during assembly on the assembly table 790. More particularly, the positioning member 720 of the fixture 710a, individually or in conjunction with one or more additional fixtures, may support one or more elements of the structural component 799 while a fastener is coupled to the one or more elements of the structural component 799. Moreover, the positioning member 720 of the fixture 710a, individually or in conjunction with one or more other fixtures, may be configured by movement of the pins 796, 794, et al, to apply directional force to the one or more elements of the structural component 799 during assembly.

Figure 8:
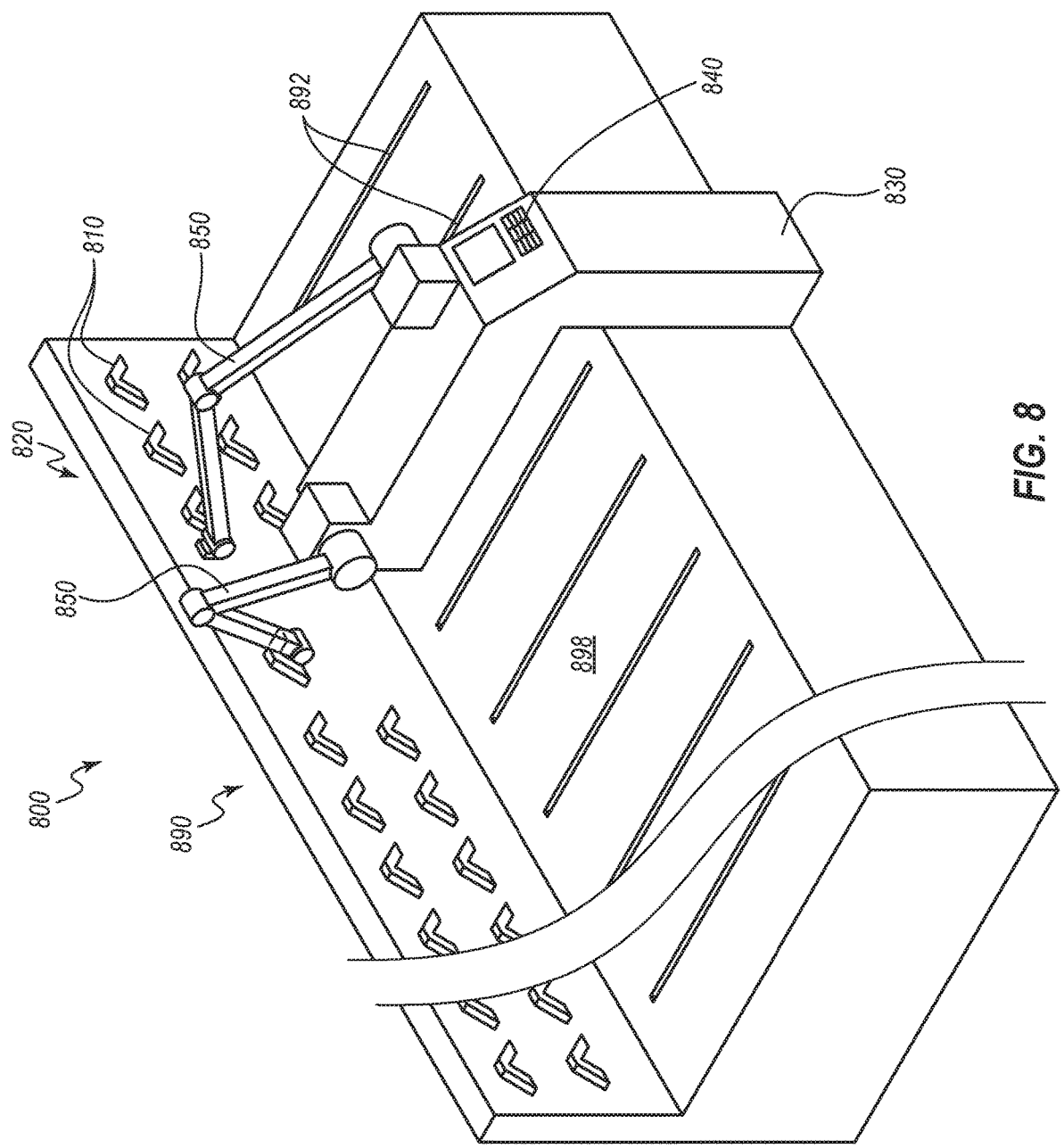
FIG. 8 is a perspective view of a structural component assembly system comprising an assembly table and a fixture repository.

FIG. 8 is a perspective view of a structural component assembly system 800 comprising an assembly table 890 and a fixture repository 820. The fixture repository 820 is configured to store a plurality of fixtures 810, wherein the plurality of fixtures 810 may comprise a variety of embodiments of fixtures according to this disclosure. The structural component assembly system 800 further comprises a control subsystem 830. The control subsystem 830 may include a general purpose or purpose-built computer capable of storing instructions and executing the stored instructions. The structural component assembly system 800 further comprises a user interface 840 whereby a user may enter instructions to be executed by the control subsystem 830. The structural component assembly system 800 further comprises at least one articulable robotic arm 850. The control subsystem 830 may, by the stored instructions or instructions received from the user interface 840, cause the articulable robotic arm 850 to articulate. The articulable robotic arm 850 may be configured to perform a variety of functions, including at least: retrieve from the fixture repository 820 a fixture 810 selected at the control subsystem; manipulate the selected fixture 810 (for example, e.g., to configure the selected fixture 810 in preparation for placement on the assembly surface 898 of the assembly table 890); place the selected fixture 810 so as to engage a selected pin (see pins 192, 194 of FIG. 2A, pins 496, 494 of FIG. 5A) and a selected pin slot (see 191 in FIG. 2A, 492 in FIG. 5A); retrieve the selected fixture 810 from the assembly surface 898 of the assembly table 890; manipulate the selected fixture 810 (for example, e.g., to configure the selected fixture 810 for storage at the fixture repository 820), and place the selected fixture 810 at the fixture repository 820. The control subsystem 830 may, by the stored instructions or by instructions entered at the user interface 840, control the position of one or more of the pins, whereby a pin is properly positioned to receive an assembly table interface, to move or articulate the selected fixture 810 on the assembly surface 898 of the assembly table 890, to position a pin so as to configure the selected fixture for removal from the assembly surface 898 of the assembly table 890.

Figure 9A:
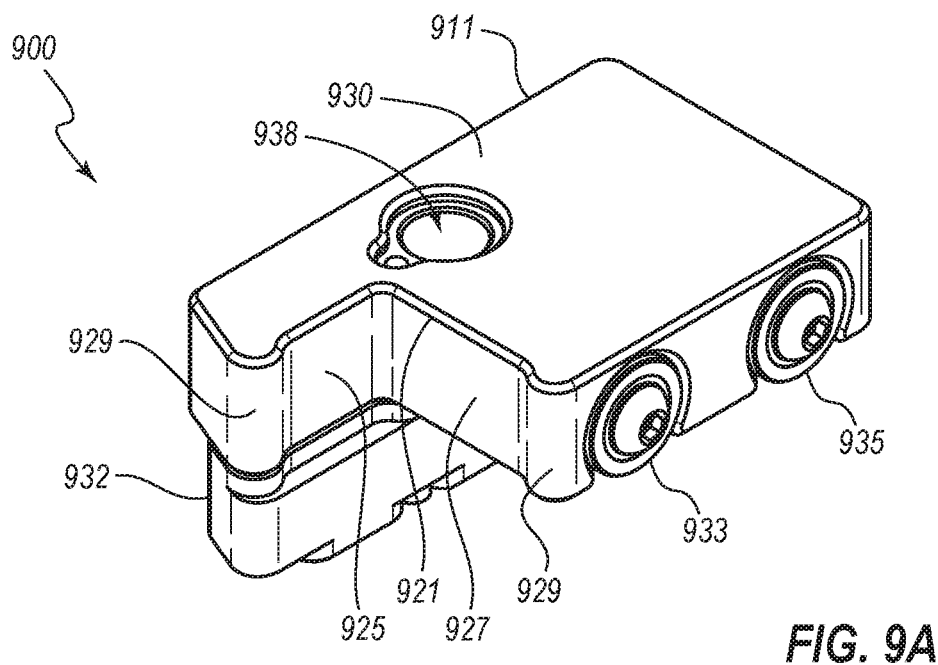
FIG. 9A is a perspective view of a fixture of a structural component assembly system, according to one embodiment.

FIG. 9A is a perspective view of a fixture 911 of a structural component assembly system 900 according to another embodiment. The fixture 911 comprises an assembly table interface 930 and a positioning member 920. The assembly table interface 930 comprises a guide rail 932, a first and second ride bearing 933, 935, and a pin aperture 938. The pin aperture 938 is configured to receive, or be received by, a pin of an assembly table (see 994, 990 in FIG. 9B). The guide rail 932 is configured to conform to a pin slot (see 992 in FIG. 9B) of the assembly table 990. The first and second ride bearings 933, 934 are configured to support the fixture 911 on an assembly surface (see 998 in FIG. 9B) of the assembly table 990. The first and second ride bearing 933, 935 each comprises a roller bearing having an axis of rotation that is parallel to the assembly surface 998 and perpendicular to a longitudinal axis of the pin slot 992.

The positioning member 920 comprises an abutment face 921 to abut an element of a structural component during assembly on the assembly table 990. The abutment face 921 comprises a longitudinal face 925 and a lateral face 927. The longitudinal face 925 of the abutment member 921 is configured to parallel, or generally parallel the pin slot 992. The lateral face 927 is disposed perpendicular, or generally perpendicular to the longitudinal face 925. On one embodiment the longitudinal face 925 and the lateral face 927, or both, may be disposed at a different angle relative to the pin slot 992 and to each other. In one embodiment, the abutment face 921 further comprises one or more protrusions 929. The protrusions 929 of the abutment face 921 may be configured to provide particular support or pressure to the element of the structural component during assembly.

Figure 9B:
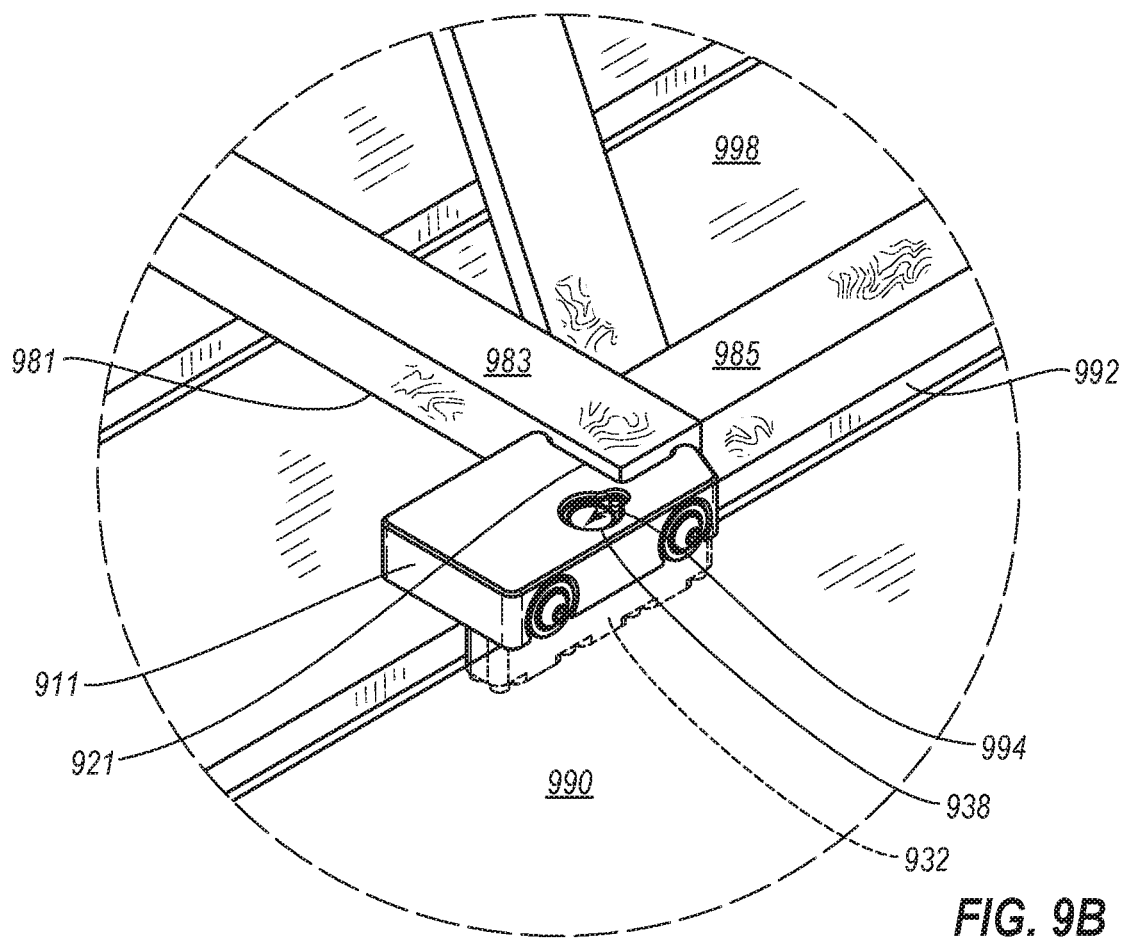
FIG. 9B is a perspective view of a structural component assembly system, according to another embodiment.

FIG. 9B is a perspective view a fixture 911 which is a mirrored embodiment of the fixture 911 of FIG. 9A. The fixture 911 is shown disposed on an assembly table 990. The pin aperture 938 is configured to conform to a form and dimension of a pin 994 of the assembly table 990. With the fixture 911 disposed with the pin aperture 938 fitted to the pin 994, the guide rail 932 is at least partially disposed within a pin slot 992 of the assembly table 990, and, more particularly, within the pin slot 992 of the pin 994. The first and second ride bearings 933, 935 rest on an assembly surface 998 of the assembly table 990 and facilitate movement of the fixture 911 when the pin 994 is moved. In other words, when the pin 994 is moved along and within the pin slot 992, the first and second ride bearings 933, 935 may rotate or roll to permit the fixture to ride along the assembly surface 998 with the pin 994. In this way, the pin 994 can be moved to selectably position the fixture 911.

In FIG. 9B, the abutment face 921 of the fixture 911 abuts a first element 983 of a structural component 981 being assembled on the assembly table 990. The longitudinal face 925 of the abutment face 921 abuts a first side of the first element 983, and the lateral face 927 abuts a second side of the first element 983 and a juncture 987. A second element 985 abuts the first element 983. The fixture 911, and more particularly, the longitudinal abutment face 925 and the lateral abutment face 927 may support the first and second elements 983, 985 of the structural component 981 preparatory to application of a fastener to the first and second elements 983, 985. The fixture 911 may be suitable for use when the juncture 987 of the first and second elements 983, 985 is distal and generally parallel to the longitudinal face 925.

Figure 10A:
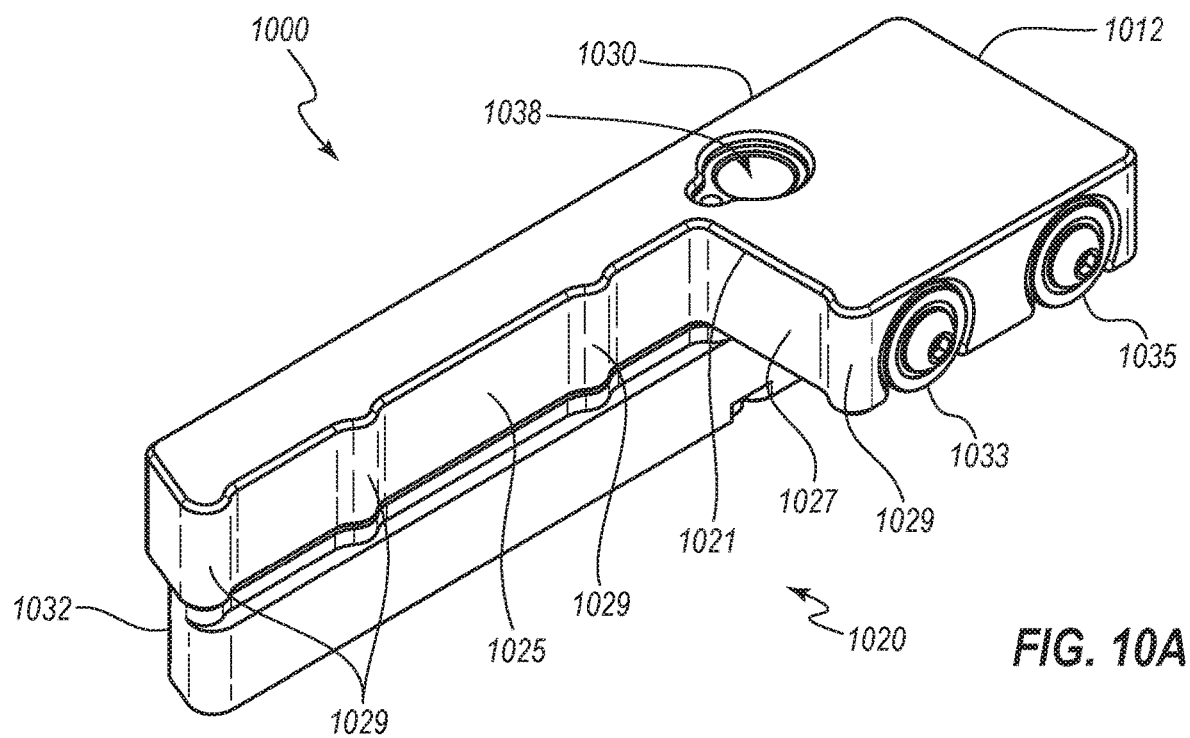
FIG. 10A is a perspective view of a fixture of a structural component assembly system, according to another embodiment.

FIG. 10A is a perspective view of a fixture 1012 of a structural component assembly system 1000, according to another embodiment. The fixture 1012 comprises an assembly table interface 1030 and a positioning member 1020. The assembly table interface 1030 comprises a guide rail 1032, a first and second ride bearing 1033, 1035, and a pin aperture 1038. The pin aperture 1038 is configured to receive, or be received by, a pin of an assembly table (see 1094, 1090 in FIG. 10B). The guide rail 1032 is configured to conform to a pin slot (see 1092 in FIG. 10B) of the assembly table 1090. The first and second ride bearings 1033, 1034 are configured to support the fixture 1012 on an assembly surface (see 1098 in FIG. 10B) of the assembly table 1090. The first and second ride bearing 1033, 1035 each comprises a roller bearing having an axis of rotation that is parallel to the assembly surface 1098 and perpendicular to a longitudinal axis of the pin slot 1092.

The positioning member 1020 comprises an abutment face 1021 to abut an element of a structural component during assembly on the assembly table 1090. The abutment face 1021 comprises a longitudinal face 1025 and a lateral face 1027. The longitudinal face 1025 of the abutment member 1021 is configured to parallel, or generally parallel the pin slot 1092. The lateral face 1027 is disposed perpendicular, or generally perpendicular to the longitudinal face 1025. On one embodiment the longitudinal face 1025 and the lateral face 1027, or both, may be disposed at a different angle relative to the pin slot 1092 and to each other. In one embodiment, the abutment face 1021 further comprises one or more protrusions 1029. The protrusions 1029 of the abutment face 1021 may be configured to provide particular support or pressure to the element of the structural component during assembly.

Figure 10B:
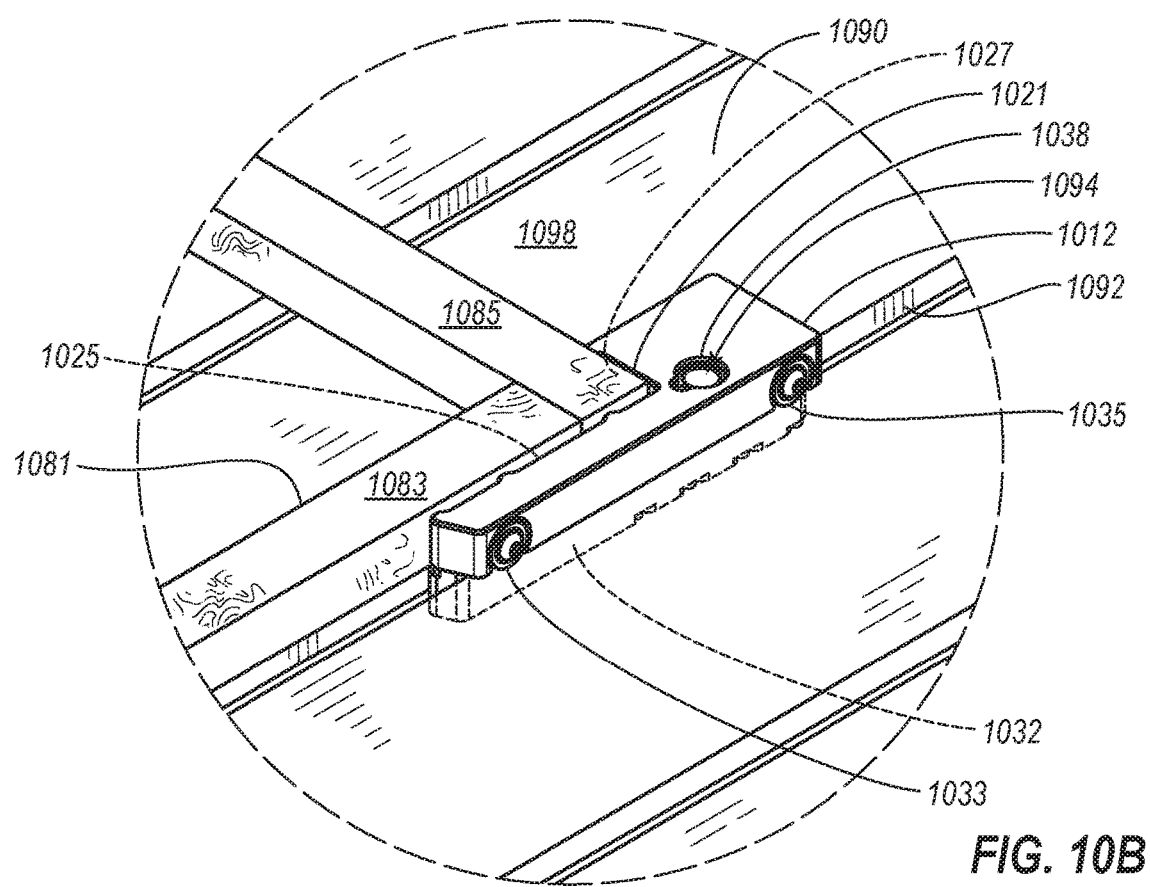
FIG. 10B is a perspective view of a structural component assembly system, according to another embodiment.

FIG. 10B is a perspective view a fixture 1012 which is a mirrored embodiment of the fixture 1012 of FIG. 10A. The fixture 1012 is shown disposed on an assembly table 1091. The pin aperture 1038 is configured to conform to a form and dimension of a pin 1094 of the assembly table 1090. With the fixture 1012 disposed with the pin aperture 1038 fitted to the pin 1094, the guide rail 1032 is at least partially disposed within a pin slot 1092 of the assembly table 1090, and, more particularly, within the pin slot 1092 of the pin 1094. The first and second ride bearings 1033, 1035 rest on an assembly surface 1098 of the assembly table 1090 and facilitate movement of the fixture 1012 when the pin 1094 is moved. In other words, when the pin 1094 is moved along and within the pin slot 1092, the first and second ride bearings 1033, 1035 may rotate or roll to permit the fixture to ride along the assembly surface 1098 with the pin 1094. In this way, the pin 1094 can be moved to selectably position the fixture 1012.

In FIG. 10B, the abutment face 1021 of the fixture 1012 abuts a first element 1083 of a structural component 1081 being assembled on the assembly table 1090. The longitudinal face 1025 of the abutment face 1021 abuts a first side of the first element 1083, and the lateral face 1027 abuts a second side of the first element 1083 and a juncture 1087. A second element 1085 abuts the first element 1083. The fixture 1012, and more particularly, the longitudinal abutment face 1025 and the lateral abutment face 1027 may support the first and second elements 1083, 1085 of the structural component 1081 preparatory to application of a fastener to the first and second elements 1083, 1085. The fixture 1012 may be suitable for use when the juncture 1087 of the first and second elements 1083, 1085 is adjacent and generally perpendicular to the longitudinal face 1025.

Figure 11:
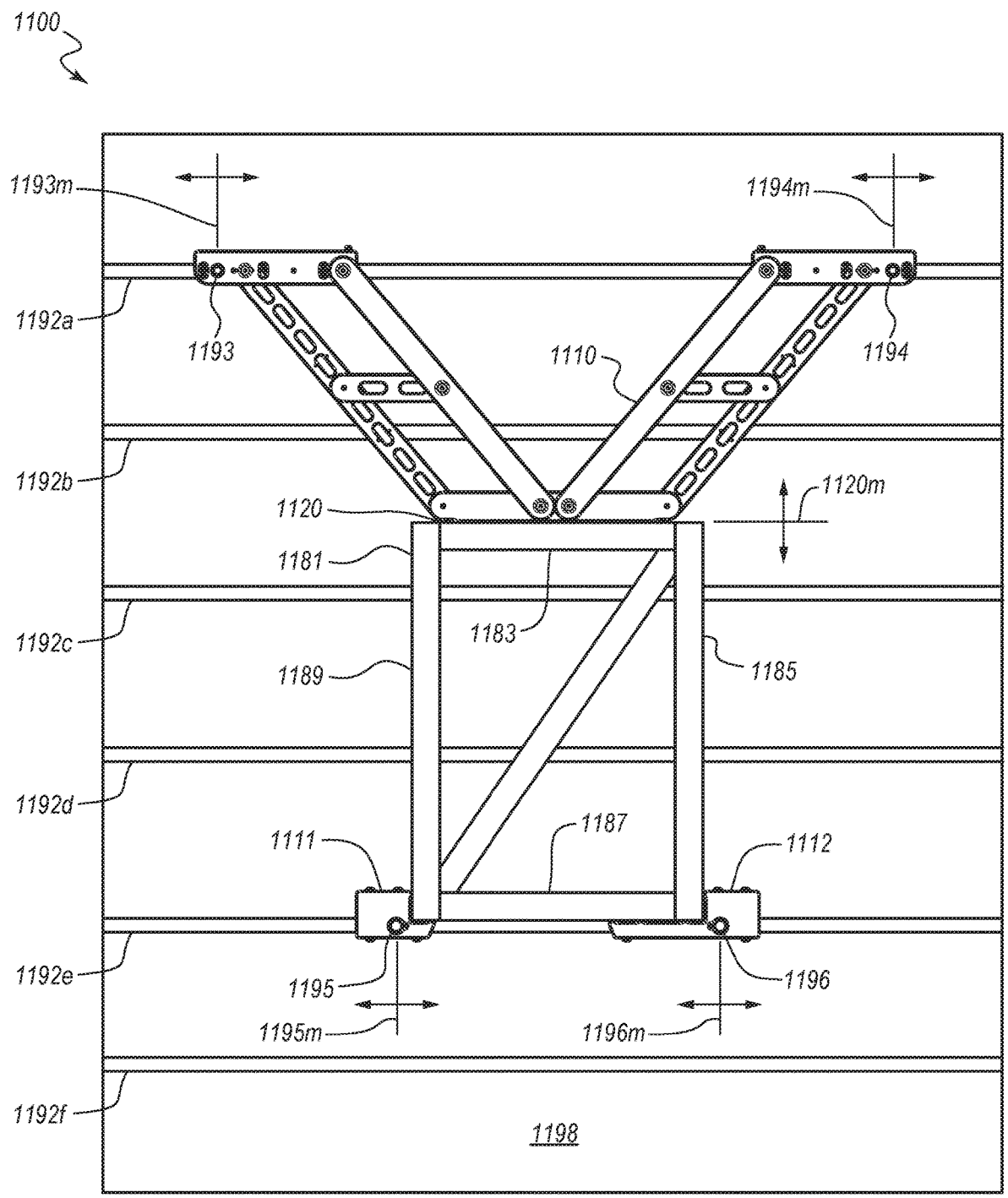
FIG. 11 is a plan view of a structural component assembly system, including a plurality of fixture types, and the plan view illustrating a point during assembly of a structural component.

FIG. 11 is a plan view of a structural component assembly system 1100 and employing a plurality of fixtures 1110, 1111, 1112 during assembly of a structural component 1181. The fixture 1110 is, in certain respects, analogous to the fixture of FIGS. 4-7. The fixture 1111 is, in certain respects, analogous to the fixture 911 of FIGS. 9A, 9B. The fixture 1112 is, in certain respects, analogous to the fixture 1012 of FIGS. 10A, 10B. The structural component 1181 comprises a first element 1183, a second element 1185, a third element 1187, and a fourth elements 1189, and is disposed on an assembly surface 1198 of an assembly table 1190. The dimension and shape of the elements 1183-1189 is for convenience of the disclosure and not a limitation.

The assembly table 1190 comprises a plurality of pin slots 1192a-1192e. The fixture 1110 has been mated to a first pin 1193 and a second pin 1194 of a first pin slot 1192a. The fixture 1111 has been mated to a pin 1195 of the fourth pin slot 1192d, and the fixture 1112 has been mated to a pin 1196 of the fourth pin slot 1192d. The disposition of each fixture 1110-1112 is but one example of many possibilities contemplated by the disclosure. Movement 1193m-1196m of each pin 1193-1196 may translate to movement of each fixture 1110-1112 to conform to a variety of size and shapes of a structural component 1181. For example, when the third element 1187 of the structural component were longer, the pin 1195 or the pin 1196, or both, could be moved outward 1195m, 1196m to selectively position the fixtures 1111, 1112 to conform to the dimension of the third element 1187. Similarly, if the third element 1187 were shorter, the pin 1195 or the pin 1196, or both, could be moved inward 1195m, 1196m to accommodate the dimension of the third element 1187. Analogously, if the second and fourth elements were longer, the pin 1193 or the pin 1194, or both, could be moved outward 1193m, 1194m which will translate to movement 1120m of the positioning member 1120 of the fixture 1110 to accommodate the longer dimension of the second and fourth elements 1185, 1189. Movement 1193m, 1194m of the pins 1193, 1194 toward each other translates to movement 1120m of the positioning member 1120 of the fixture 1110 toward the fixtures 1111, 1112 to accommodate a shorter dimension of the second and fourth elements 1185, 1189.

The use, in FIG. 11, of the fixtures 1110, 1111, 1112 is as one example of the structural component system 1100. This disclosure anticipates numerous embodiments, including, by way of example: a system having two or more fixtures 1110; a system having two or more fixtures 1111; a system having two or more fixtures 1112; a system having a fixture according to another embodiment; a system having at least one fixture of at least two embodiments; etc.

Figure 12A:
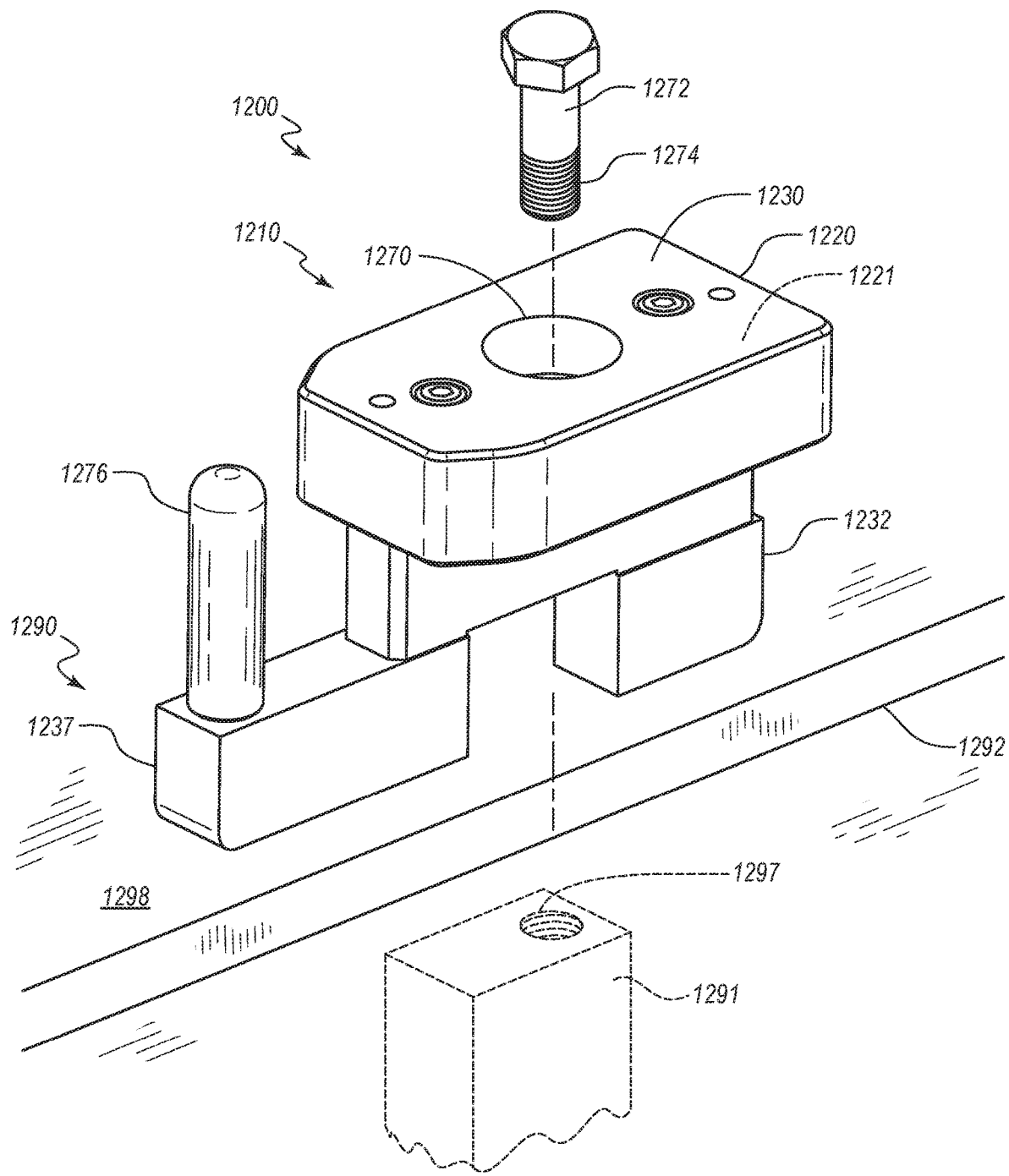
FIG. 12A is a perspective view of a structural component assembly system having a fixture configured to serve as a proxy for a pin of an assembly table, according to an embodiment of the disclosure.

FIG. 12A is a perspective view of a structural component assembly system 1200 having a fixture 1210 configured to serve as a proxy for a pin of an assembly table 1290, according to an embodiment of the disclosure. An assembly surface 1298 of the assembly table 1290 is shown for reference. The fixture 1210 comprises an assembly table interface 1230 having a guide rail 1232, a bolt aperture 1270, and a bolt 1272. The bolt aperture 1270 passes through the assembly table interface 1230, including through the guide rail 1232. The bolt 1272 may pass through the bolt aperture 1270 and couple to a pin sled 1291 of the assembly table 1290. In other words, a pin of the assembly table 1290 may be removed from its respective pin sled 1291, and the bolt 1272 may pass through the bolt aperture 1270 to couple to the pin sled 1291 in place of the pin. In one embodiment, the bolt 1272 may be configured with threads 1274 conforming to threads 1297 of the pin sled 1291. The guide rail 1232 may have a form and a dimension to closely fit within a pin slot 1292 of an assembly table. In other words, the guide rail 1232 may have a width or be otherwise configured to fit within the pin slot 1292 of the assembly table 1290 in a fixed orientation, e.g., so as not to rotate within the pin slot 1292. The guide rail 1232 may further be configured at one end with a pin carrier 1237. The pin carrier 1237 may comprise, or have attached thereto, a pin 1276. The pin 1276 may be particularly configured to receive a fixture, such as a fixture according to an embodiment of this disclosure. In other words, a pin aperture of a fixture, such as the fixture 110, 410, 710a, 810, 911, 1012, 1110 of FIGS. 1-11 (fixture 110, etc.), may be coupled to the pin 1276 of the fixture 1210.

In one embodiment, the fixture 1210 may further comprise a positioning member 1221 having an abutment face 1220 to abut against an element of a structural component on an assembly table. The identification of the abutment face 1220 at and end of the assembly table interface 1230 opposite the pin 1276 is for convenience of the disclosure only and not by way of limitation.

Figure 12B:
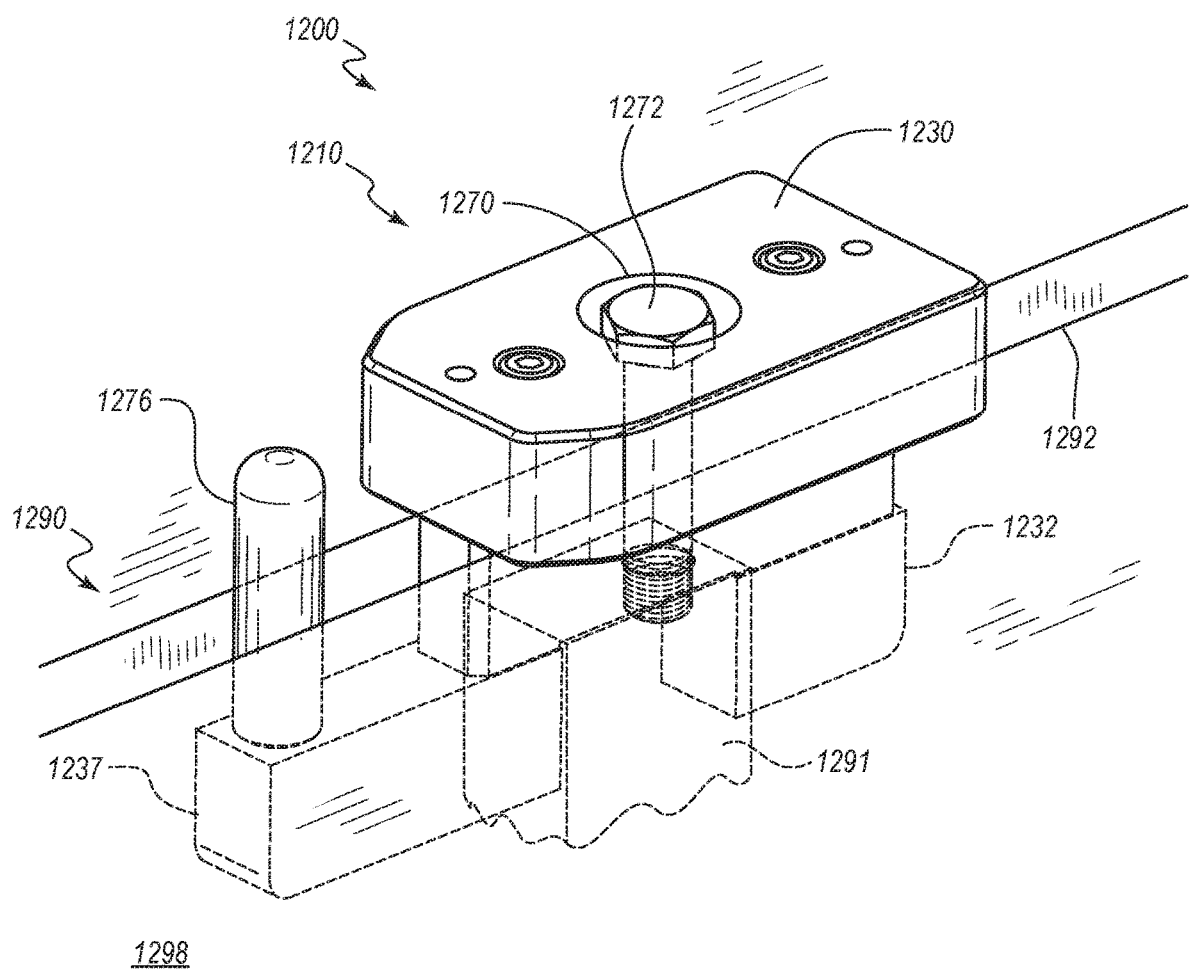
FIG. 12B is a perspective view of the structural component assembly system of FIG. 12A with the fixture coupled to the pin sled.

FIG. 12B is a perspective view of the structural component assembly system 1200 of FIG. 12A with the fixture 1210 coupled to the pin sled 1291. The assembly table interface 1230 is coupled to the pin sled 1291 by means of the bolt 1272 (passing through the bolt aperture 1270), and the guide rail 1232 is fitted into the pin slot 1292. The pin carrier 1237 may be configured so the pin 1276 extends from the pin slot 1292 above the assembly surface 1298 of the assembly table 1290, whereby the pin 1276 is configured to receive a pin aperture of a fixture, such as the fixture 110, etc.

With the fixture 1210 coupled to the pin sled 1291 of the assembly table 1290, the pin sled 1291 may be moved along its pin slot 1292, whereby the fixture 1210 is identically moved along the pin slot 1292. A fixture, such as a fixture 110, etc., coupled to the fixture 1210 may be moved along the pin slot 1292 as the pin sled 1291 moves along the pin slot 1292. The fixture 1210 may be interposed between the pin sled 1291 and a fixture 110, etc., for a number of reasons, such as, e.g., to overcome a defect in a pin, wear in a pin, damage of a pin, a missing pin, or otherwise to provide a more desirable configuration of the fixture 110, etc.

EXAMPLES

Example 1

A fixture for assembling a structural component, the fixture comprising: a first assembly table interface comprising a first pin aperture and a first guide rail, wherein the first pin aperture is configured to receive a first pin of an assembly table, and wherein the first guide rail is configured to interface with (and to be received by) a pin slot of the assembly table; a positioning member configured to abut against a structural component to retain the structural component in a position on the assembly table and relative to the first pin of the assembly table to receive a fastener, wherein the fastener is to join two elements (e.g., pieces or members) of the structural component; and a linkage assembly extending between and coupling the first assembly table interface and the positioning member, wherein movement of the assembly table interface is translated through the linkage assembly to cause movement of the linkage assembly and thereby move the positioning member.

Example 2

The fixture of example 1, wherein the linkage assembly comprises a first bar of a fixed length and width.

Example 3

The fixture of examples 1 and 2, wherein the positioning member further comprises a positioning member first pivot having a pivot axis perpendicular to a plane of an assembly surface of the assembly table; and wherein a first end of the first bar of the linkage assembly pivotably couples to the positioning member at the positioning member first pivot; and wherein a longitudinal axis of the first bar of the linkage assembly pivots about the positioning member first pivot and within a plane parallel to the assembly surface of the assembly table.

Example 4

The fixture of examples 1-3, wherein the first assembly table interface further comprises a first assembly table interface first pivot having a pivot axis perpendicular to the plane of the assembly surface of the assembly table; and wherein a second end of the first bar of the linkage assembly pivotably couples to the first assembly table interface at the first assembly table interface first pivot; and wherein the longitudinal axis of the first bar of the linkage assembly pivots about the first assembly table interface first pivot and within the plane parallel to the assembly surface of the assembly table.

Example 5

The fixture of examples 1 and 2, wherein the linkage assembly further comprises an additional bar of substantially the same length and width as the first bar.

Example 6

The fixture of example 1, wherein the linkage assembly comprises a 4-bar linkage mechanism, comprising four bars disposed to form a parallelogram lying within a plane parallel to an assembly surface of the assembly table, wherein the positioning member comprises a first bar of a first pair of bars and the first assembly table interface comprises a second bar of the first pairs of bars, wherein the first pair of bars defines a first pair of equal and opposite sides of the parallelogram, and two additional bars comprise a second pair of equal and opposite sides of the parallelogram, and wherein each bar of the four bars pivotably couples to an adjacent bar of the four bars at a respective intersection of the parallelogram, and wherein the first pair of equal and opposite sides remain parallel during pivot movement of the linkage assembly, and wherein pivoting of the linkage assembly causes the positioning member to be selectively repositionable on the assembly surface of the assembly table while retaining an orientation of the positioning member relative to the assembly surface.

Example 7

The fixture of examples 1 and 6, the linkage assembly further comprising a medial stability member extending between and coupled to the two additional bars and disposed between the positioning member and the first assembly table interface, the medial stability member comprising a second pin aperture to receive a second pin of the assembly table, wherein the fixture couples to the assembly table at a first pin of the assembly table and at a second pin of the assembly table, and wherein movement of one or both of the first pin and second pin selectively positions the positioning member on the assembly surface of the assembly table.

Example 8

The fixture of examples 1, 6, and 7, the medial stability member further comprising a second guide rail to interface with and to be received by a second pin slot of the assembly table.

Example 9

The fixture of examples 1, 6, and 7, wherein the medial stability member is slidably coupled to the two additional bars of the linkage assembly to slide along a portion of a length of the two additional bars as one or both of the first pin and second pin move relative to the other pin.

Example 10

The fixture of example 1, wherein the first pin aperture of the first assembly table interface has a form and a dimension conforming to a form and a dimension of the first pin of the assembly table.

Example 11

The fixture of example 1, wherein the first assembly table interface couples to the assembly table by placing the first pin aperture about the first pin of the assembly table to fix the first assembly table interface relative to the first pin of the assembly table.

Example 12

The fixture of example 1, wherein the first guide rail has a form and a dimension conforming to the pin slot of the assembly table.

Example 13

The fixture of example 1, wherein the first assembly table interface couples to the assembly table by placing the first pin aperture about the first pin of the assembly table and the first guide rail in the pin slot to fix the first assembly table interface at an orientation relative to the first pin of the assembly table.

Example 14

The fixture of example 1, wherein movement of the first pin of the assembly table along the pin slot translates to identical movement of the first assembly table interface while maintaining the orientation of the first assembly table interface relative to the first pin.

Example 15

The fixture of example 1, further comprising a second assembly table interface comprising a second pin aperture configured to receive a second pin of the assembly table; and a second linkage assembly extending between and coupling the second assembly table interface and the positioning member, wherein, upon movement of the first and second pins, the first and second assembly table interfaces move, and movement of the first and second assembly table interface members adjusts positioning of the first and second linkage assemblies to adjust a position of the positioning member while maintaining a fixed orientation of the positioning member relative to the first and second pins.

Example 16

The fixture of examples 1 and 15, wherein the second assembly table interface further comprises a second guide rail to interface with one of the pin slot of the assembly table or another pin slot of the assembly table.

Example 17

The fixture of examples 1 and 15, wherein the first linkage assembly and the second linkage assembly are each a 4-bar linkage mechanism comprising four bars disposed to form a parallelogram lying within a plane parallel to an assembly surface of the assembly table, wherein the positioning member comprises a first bar of a first pair of bars of a first parallelogram and a first bar of a first pair of bars of a second parallelogram, the first assembly table interface comprises a second bar of the first pair of bars of the first parallelogram, wherein the first and second bars of the first pair of bars of the first parallelogram define a first pair of equal and opposite sides of the first parallelogram, two first additional bars define a second pair of equal and opposite sides of the first parallelogram, and the second assembly table interface comprises a second bar of the first pair of bars of the second parallelogram, wherein the first and second bars of the first pair of bars of the second parallelogram define a first pair of equal and opposite sides of the second parallelogram, and two second additional bars define a second pair of equal and opposite sides of the second parallelogram, and wherein each bar pivotably couples to an adjacent bar at a respective intersection of the respective parallelogram, and wherein the first pair of equal and opposite sides of the first parallelogram remain parallel during pivot movement of the linkage assembly, and wherein pivoting of the first and second linkage assemblies causes the positioning member to be selectively repositionable on an assembly surface of the assembly table while retaining an orientation of the positioning member relative to the assembly surface.

Example 18

A structural component assembling system comprising: an assembly table having a plurality of movable pins each in a pin slot; one or more fixtures each comprising: a first assembly table interface comprising a first pin aperture and a first guide rail, wherein the first pin aperture is configured to receive a first movable pin of the assembly table, and wherein the first guide rail is configured to interface with the pin slot of the assembly table; and a positioning member configured to abut against a structural component to retain the structural component in a position on the assembly table and fixed relative to the first movable pin of the assembly table, the positioning member to retain the structural component to receive a fastener to join two elements (e.g., pieces) of the structural component, wherein at least one of the one or more fixtures further comprises a linkage assembly extending between and coupling the first assembly table interface and the positioning member, wherein movement of the first movable pin causes movement of the assembly table interface, which movement causes movement of the linkage assembly to thereby move the positioning member.

Example 19

The structural component assembling system of example 18, wherein the linkage assembly of the at least one or more fixtures comprises a first bar of a fixed length and a fixed width.

Example 20

The structural component assembling system of example 18, wherein the linkage assembly of the at least one of the one or more fixtures comprises a 4-bar linkage mechanism comprising four bars disposed to form a parallelogram lying within a plane parallel to an assembly surface of the assembly table, wherein the positioning member comprises a first bar of a first pair of bars and the first assembly table interface comprises a second bar of the first pair of bars, the first pair of bars defining a pair of equal and opposite sides of the parallelogram, and two additional bar define a second pair of equal and opposite sides of the parallelogram, and wherein each bar of the four bars pivotably couples to an adjacent bar of the four bars at a respective intersection of the parallelogram, and wherein the first pair of equal and opposite sides remain parallel during pivot movement of the linkage assembly, and wherein pivoting of the linkage assembly causes the positioning member to be selectively repositionable on the assembly surface of the assembly table while retaining an orientation of the positioning member relative to the assembly surface.

Example 21

The structural component assembling system of examples 18 and 19, wherein the at least one of the one or more fixtures further comprises: a second assembly table interface comprising a second pin aperture configured to receive a second pin of the assembly table; and a second linkage assembly extending between and coupling the second assembly table interface and the positioning member, wherein, upon movement of the first and second pins, the first and second assembly table interfaces move, and movement of the first and second assembly table interfaces adjusts positioning of the first and second linkage assemblies to adjust a position of the positioning member while maintaining a fixed orientation of the positioning member relative to the first and second pins.

Example 22

The structural component assembling system of examples 18, 19, and 21, wherein the second assembly table interface further comprises a second guide rail to interface with one of the pin slot of the assembly table or another pin slot of the assembly table.

Example 23

The structural component assembling system of examples 18, 19, 21, and 22, the first linkage assembly and the second linkage assembly each comprising a 4-bar mechanism, the 4-bar linkage mechanism of the first linkage assembly comprising four bars disposed to form a first parallelogram, and the 4-bark linkage mechanism of the second linkage assembly comprising four bars disposed to form a second parallelogram, the first and second parallelograms lying within a plane parallel to an assembly surface of the assembly table, wherein: the positioning member comprises a first bar of a first pair of bars of the first parallelogram and a first bar of a first pair of bars of the second parallelogram; the first assembly table interface comprises a second bar of the first pair of bars of the first parallelogram, wherein the first and second bars of the first pair of bars of the first parallelogram define a first pair of equal and opposite sides of the first parallelogram; two first additional bars define a second pair of equal and opposite sides of the first parallelogram; the second assembly table interface comprises a second bar of the first pair of bars of the second parallelogram, wherein the first and second bars of the first pair of bars of the second parallelogram define a first pair of equal and opposite sides of the second parallelogram; and two second additional bars define a second pair of equal and opposite sides of the second parallelogram, wherein each bar pivotably couples to an adjacent bar at a respective intersection of the respective parallelogram, wherein the first pair of equal and opposite sides of the first parallelogram remain parallel during pivot movement of the first linkage assembly, and wherein pivoting of the first and second linkage assemblies causes the positioning member to be selectively repositionable on an assembly surface of the assembly table while retaining an orientation of the positioning member relative to the assembly surface.

Example 24

A structural component assembling system comprising: an assembly table having a plurality of pin slots each having a first movable pin; a fixture comprising: a first assembly table interface to interface with the first movable pin of a pin slot of the assembly table; a positioning member configured to abut against an element (e.g., a piece) of a structural component; and a linkage assembly extending between and coupling the first assembly table interface with the positioning member, wherein movement of the first movable pin moves the first assembly table interface, which moves the linkage assembly and thereby moves the positioning member; a fixture repository configured to receive and store (e.g., away from or otherwise off an assembly surface of the assembly table) at least one fixture, and further configured to allow removal and replacement of the fixture; and an articulable robotic arm configured to: move the fixture from the fixture repository to a selectable location of the assembly surface of the assembly table, whereby the assembly table interface engages the first movable pin; move the fixture from the assembly surface of the assembly table to a storage position of the fixture repository.

Example 25

The structural component assembling system of example 24, wherein the positioning member is configured to retain the structural component in a position on the assembly table and relative to the first movable pin of the assembly table to receive a fastener, wherein the fastener is to join at two elements of the structural component.

Example 26

The structural component assembling system of examples 24 and 25, wherein the linkage assembly comprises a 4-bar linkage mechanism comprising four bars disposed to form a parallelogram lying within a plane parallel to an assembly surface of the assembly table, wherein: the positioning member comprises a first bar of a first pair of bars of the four bars of the parallelogram; the first assembly table interface comprises a second bar of the first pair of bars; two additional bars define a second pair of equal and opposite sides of the parallelogram, wherein each bar of the four bars pivotably couples to an adjacent bar of the four bars at a respective intersection of the parallelogram, wherein the first pair of bars define a first pair equal and opposite sides which remain parallel during pivot movement of the linkage assembly, and wherein pivoting of the linkage assembly causes the positioning member to be selectively repositionable on the assembly surface of the assembly table while retaining an orientation of the positioning member relative to the assembly surface.

Example 27

The structural component assembling system of examples 24 and 25, further comprising: a second assembly table interface to interface with a second movable pin of the assembly table; a second linkage assembly extending between and coupling the second assembly table interface and the positioning member, wherein, movement of the first and second pins moves the first and second assembly table interfaces, which translates to moving the first and second linkage assemblies, which adjusts a position of the positioning member while maintaining a fixed orientation of the positioning member relative to the first and second pins.

Example 28

The structural component assembling system of examples 24, 25, and 27, wherein the first linkage assembly and the second linkage assembly are each a 4-bark linkage mechanism.

Example 29

The structural component assembling system of examples 24 and 25, further comprising a computer to operate the robotic arm, the computer comprising: a data storage device; and a processor to access and execute instructions stored in the data storage device to cause the processor to facilitate assembly of the structural component, including to: select the fixture, based on the fixture being suitable for use in assembling the structural component; determine a location of the first movable pin within a slot of the assembly table; cause the robotic arm to move the fixture from the fixture repository and position the fixture on the assembly surface of the assembly table with the first assembly table interface interfaced with the first movable pin.

Example 30

The structural component assembling system of examples 24, 25, and 29, wherein the processor further selects the fixture from among a plurality of fixtures in the fixture repository.

Example 31

The structural component assembling system of examples 24, 25, and 29, wherein the processor accesses and executes instructions stored in the data storage device to cause the processor to facilitate assembly of the structural component, further including: to determine a location of another movable pin of the assembly table; and to cause the robotic arm to reposition the fixture on the assembly surface of the assembly table to interface with another movable pin of the assembly table.

Example 32

The structural component assembling system of examples 24, 25, 29, and 31, the processor further receives input designating the another pin movable of the assembly table.

Example 33

The structural component assembling system of examples 24, 25, 29, and 31, wherein the processor accesses and executes instructions stored in the data storage device to cause the processor to facilitate assembly of the structural component, further including to case the robotic arm to move the selected fixture from the assembly surface of the assembly table to a storage position within the fixture repository.

Example 34

The structural component assembling system of examples 24, 25, 29, 31, and 33, the processor further to determine the storage position within the fixture repository.

Example 35

The structural component assembling system of examples 24, 25, 29, and 31, further comprising a user interface to receive user input to direct operation of the robotic arm.

Example 36

A structural component assembly system comprising a first and second assembly table interface, and a first linkage assembly and a second linkage assembly wherein each linkage assembly is a 4-bar linkage assembly; and wherein the first 4-bar linkage assembly comprises four bars disposed to form a first parallelogram and the second 4-bar linkage assembly comprises four bars disposed to form a second parallelogram, the first and second parallelograms lying within a plane parallel to an assembly surface of the assembly table, wherein the positioning member comprises a first bar of a first pair of bars of the first parallelogram and simultaneously forms a first bar of a first pair of bars of the second parallelogram, and the first assembly table member comprises a second bar of the first pair of bars of the first parallelogram, wherein the first and second bars of the pair of bars of the first parallelogram define a first pair of equal and opposite sides of the first parallelogram, and two additional bars define a second pair of equal and opposite sides of the first parallelogram, and the second assembly table member comprises a second bar of the first pair of bars of the second parallelogram, wherein the first and second bars of the first pair of bars of the second parallelogram define a first pair of equal and opposite sides of the second parallelogram, and two additional bars define a second pair of equal and opposite sides of the second parallelogram, and wherein each bar pivotably couples to an adjacent bar at a respective intersection of the respective parallelogram, and wherein the first pair of equal and opposite sides of the first parallelogram remain parallel during pivot movement of the first linkage assembly, and wherein pivoting of the first and second linkage assemblies causes the positioning member to be selectively repositionable on the assembly surface of the assembly table while retaining an orientation of the positioning member relative to the assembly surface.

Example 37

A structural component assembly system comprising a fixture, a fixture repository configured to store at least one fixture, a computer, and a robotic arm, the computer configured to operate the robotic arm and comprising a data storage device and a processor, the processor capable of accessing and executing instructions stored in the data storage device, and wherein the instructions comprise programmatic instructions to facilitate assembly of the structural component, whereby the computer at least one of: selects a fixture suitable for use in assembling the structural component, causes the robotic arm to retrieve the selected fixture from the fixture repository, causes the robotic arm to position the selected fixture on the assembly surface of the assembly table, causes the robotic arm to reposition the selected fixture on the assembly surface of the assembly table, causes the robotic arm to remove the selected fixture from the assembly surface of the assembly table, and causes the robotic arm to place the selected fixture at the fixture repository.

Example 38

A structural component assembling system comprising a user interface whereby a user may at least one of: activate a computer whereby instructions stored at a data storage device may be read and executed whereby a fixture may be positioned to, repositioned at, or removed from the assembly surface of the assembly table, deactivates the computer, manually enters instructions whereby the computer performs at least one instruction, and manually operate (enter instructions controlling) a robotic arm.

In the foregoing description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. A fixture for assembling a structural component, the fixture comprising:
a first assembly table interface comprising a first pin aperture and a first guide rail, wherein the first pin aperture is configured to receive a first pin of an assembly table, and wherein the first guide rail is configured to interface with a pin slot of the assembly table;
a positioning member configured to abut against a structural component to retain the structural component in a position on the assembly table and relative to the first pin of the assembly table to receive a fastener, wherein the fastener is to join two elements of the structural component; and
a linkage assembly extending between and coupling the first assembly table interface and the positioning member, wherein movement of the assembly table interface is translated through the linkage assembly to move the positioning member,
wherein the first assembly table interface couples to the assembly table by placing the first pin aperture about the first pin of the assembly table and the first guide rail in the pin slot to fix the first assembly table interface at an orientation relative to the first pin of the assembly table.

2. The fixture of claim 1, wherein the linkage assembly comprises a first bar of a fixed length and a fixed width.

3. The fixture of claim 2, wherein the positioning member further comprises a positioning member first pivot having a pivot axis perpendicular to a plane of an assembly surface of the assembly table; and
wherein a first end of the first bar of the linkage assembly pivotably couples to the positioning member at the positioning member first pivot.

4. The fixture of claim 3, wherein the first assembly table interface further comprises a first assembly table interface first pivot having a pivot axis perpendicular to the plane of the assembly surface of the assembly table; and
wherein a second end of the first bar of the linkage assembly pivotably couples to the first assembly table interface at the first assembly table interface first pivot; and
wherein the longitudinal axis of the first bar of the linkage assembly pivots about the first assembly table interface first pivot and within the plane parallel to the assembly surface of the assembly table.

5. The fixture of claim 2, wherein the linkage assembly further comprises an additional bar of substantially the same length as the first bar.

6. The fixture of claim 1, wherein the linkage assembly comprises a 4-bar linkage mechanism, comprising four bars disposed to form a parallelogram lying within a plane parallel to an assembly surface of the assembly table, the four bars comprising a first pair of parallel bars and a second set of parallel bars,
  wherein the positioning member comprises a first bar of the first pair of parallel bars and the first assembly table interface comprises a second bar of the first pair of parallel bars, and two additional bars comprise the second pair of parallel bars of the parallelogram, and
  wherein each bar of the four bars pivotably couples to an adjacent bar of the four bars at a respective intersection of the parallelogram, and
  wherein pivoting of the linkage assembly causes the positioning member to be selectively repositionable on the assembly surface of the assembly table while retaining an orientation of the positioning member relative to the assembly surface.

7. The fixture of claim 6, the linkage assembly further comprising a medial stability member extending between and coupled to the two additional bars and disposed between the positioning member and the first assembly table interface, the medial stability member comprising a second pin aperture to receive a second pin of the assembly table,
  wherein the fixture couples to the assembly table at a first pin of the assembly table and at a second pin of the assembly table, and
  wherein movement of one of the first pin and the second pin selectively positions the positioning member on the assembly surface of the assembly table.

8. The fixture of claim 7, the medial stability member comprising a second guide rail to interface with a second pin slot of the assembly table.

9. The fixture of claim 7, wherein the medial stability member is slidably coupled to the two additional bars of the linkage assembly to slide along a portion of a length of the two additional bars as either pin move relative to the other pin.

10. The fixture of claim 1, further comprising:
  a second assembly table interface comprising a second pin aperture configured to receive a second pin of the assembly table; and
  a second linkage assembly extending between and coupling the second assembly table interface and the positioning member,
  wherein, upon movement of one of the first and second pins, the respective assembly table interface moves, and
  movement of one of the first or second assembly table interfaces adjusts positioning of the first and second linkage assemblies to adjust a position of the positioning member while maintaining a fixed orientation of the positioning member relative to the first and second pins.

11. The fixture of claim 10, wherein the second assembly table interface further comprises a second guide rail to interface with one of the pin slot of the assembly table or another pin slot of the assembly table.

12. The fixture of claim 10, wherein the first linkage assembly and the second linkage assembly are each a 4-bar linkage mechanism comprising four bars disposed to form a parallelogram lying within a plane parallel to an assembly surface of the assembly table, wherein
  the positioning member comprises a first bar of a first pair of parallel bars of a first parallelogram and a first bar of a first pair of parallel bars of a second parallelogram,
  the first assembly table interface comprises a second bar of the first pair of parallel bars of the first parallelogram,
  two first additional bars define a second pair of parallel bars of the first parallelogram, and
  the second assembly table interface comprises a second bar of the first pair of parallel bars of the second parallelogram, and
  two second additional bars define a second pair of parallel bars of the second parallelogram, and
  wherein each bar pivotably couples to an adjacent bar at a respective intersection of the respective parallelogram, and
  wherein the first pair of equal and opposite sides of the first parallelogram remain parallel during pivot movement of the linkage assembly, and
  wherein pivoting of the first and second linkage assemblies causes the positioning member to be selectively repositionable on an assembly surface of the assembly table while retaining an orientation of the positioning member relative to the assembly surface.

13. The fixture of claim 1, wherein the first pin aperture of the first assembly table interface has a form and a dimension conforming to a form and a dimension of the first pin of the assembly table.

14. The fixture of claim 1, wherein the first assembly table interface couples to the assembly table by placing the first pin aperture about the first pin of the assembly table to fix the first assembly table interface relative to the first pin of the assembly table.

15. The fixture of claim 1, wherein the first guide rail has a form and a dimension conforming to the pin slot of the assembly table.

16. The fixture of claim 1, wherein movement of the first pin of the assembly table along the pin slot translates to identical movement of the first assembly table interface while maintaining the orientation of the first assembly table interface relative to the first pin.

17. A structural component assembling system comprising:
  an assembly table having a plurality of movable pins each in a pin slots; and
  one or more fixtures each comprising:
    a first assembly table interface comprising a first pin aperture and a first guide rail, wherein the first pin aperture is configured to receive a first movable pin of the assembly table, and wherein the first guide rail is configured to interface with the pin slot of the assembly table; and
    a positioning member configured to abut against a structural component to retain the structural component in a position on the assembly table and fixed relative to the first movable pin of the assembly table, the positioning member to retain the structural component to receive a fastener to join two elements of the structural component,
    wherein at least one of the one or more fixtures further comprises a linkage assembly extending between and coupling the first assembly table interface and the positioning member, wherein movement of the first movable pin causes movement of the first assembly table interface, which movement causes movement of the linkage assembly to thereby move the positioning member.

18. The structural component assembling system of claim 17, wherein the linkage assembly of the at least one or more fixtures comprises a first bar of a fixed length.

19. The structural component assembling system of claim 17, wherein the linkage assembly of the at least one or more fixtures comprises a 4-bar linkage mechanism
comprising four bars disposed to form a parallelogram lying within a plane parallel to an assembly surface of the assembly table, wherein
the positioning member comprises a first bar of a first pair of bars and the first assembly table interface comprises a second bar of the first pair of bars, and two additional bars comprise a second pair of bars of the parallelogram, and
wherein each bar of the four bars pivotably couples to an adjacent bar of the four bars at a respective intersection of the parallelogram, and
wherein the first pair of bars remain parallel during pivot movement of the linkage assembly, and
wherein pivoting of the linkage assembly causes the positioning member to be selectively repositionable on the assembly surface of the assembly table while retaining an orientation of the positioning member relative to the assembly surface.

20. The structural component assembling system of claim 17, wherein the at least one of the one or more fixtures further comprises:
a second assembly table interface comprising a second pin aperture configured to receive a second pin of the assembly table,
a second linkage assembly extending between and coupling the second assembly table interface and the positioning member,
wherein, upon movement of the first and second pins, the first and second assembly table interfaces move, and
movement of the first and second assembly table interfaces adjusts positioning of the first and second linkage assemblies to adjust a position of the positioning member while maintaining a fixed orientation of the positioning member relative to the first and second pins.

21. The structural component assembling system of claim 20, wherein the second assembly table interface further comprises a second guide rail to interface with one of the pin slot of the assembly table or another pin slot of the assembly table.

22. The structural component assembling system of claim 20, wherein the first linkage assembly and the second linkage assembly are each a 4-bar linkage mechanism, wherein
a first 4-bar linkage mechanism comprises four bars disposed to form a first parallelogram and a second 4-bar linkage assembly comprises four bars disposed to form a second parallelogram, the first and second parallelograms lying within a plane parallel to an assembly surface of the assembly table, wherein
the positioning member comprises a first bar of a first pair of parallel bars of the first parallelogram and a first bar of a first pair of parallel bars of the second parallelogram, and
the first assembly table member comprises a second bar of the first pair of parallel bars of the first parallelogram, and
two first additional bars define a second pair of parallel bars of the first parallelogram, and
the second assembly table member comprises a second bar of the first pair of parallel bars of the second parallelogram, and
two second additional bars define a second pair of parallel bars of the second parallelogram, and
wherein each bar pivotably couples to an adjacent bar at a respective intersection of the respective parallelogram, and
wherein pivoting of the first and second linkage assemblies causes the positioning member to be selectively repositionable on an assembly surface of the assembly table while retaining an orientation of the positioning member relative to the assembly surface.

* * * * *